United States Patent
Isom

(10) Patent No.: US 6,948,173 B1
(45) Date of Patent: *Sep. 20, 2005

(54) METHOD OF SEQUENCING COMPUTER CONTROLLED TASKS BASED ON THE RELATIVE SPATIAL LOCATION OF TASK OBJECTS IN A DIRECTIONAL FIELD

(76) Inventor: Fred Steven Isom, 3411 ½ Heyward St., Colombia, SC (US) 29205-2755

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1043 days.

(21) Appl. No.: 08/905,701

(22) Filed: Aug. 4, 1997

(51) Int. Cl.[7] ............................................. G06F 3/00
(52) U.S. Cl. ...................................... 719/316; 718/100
(58) Field of Search ........................ 709/100; 395/348; 719/316; 718/100

(56) References Cited

U.S. PATENT DOCUMENTS

| | | | | |
|---|---|---|---|---|
| 4,860,204 A | * | 8/1989 | Gendron et al. | 395/702 |
| 5,623,592 A | * | 4/1997 | Carlson et al. | 345/348 |
| 5,767,852 A | * | 6/1998 | Keller et al. | 345/348 |
| 5,850,548 A | * | 12/1998 | Williams | 395/701 |

OTHER PUBLICATIONS

"Widening 'world' of neural nets" Johnson, R. Colin (Electronic Engineering Times , n756 , p35, Jul. 26, 1993).*

Ingalls et al., Sep. 25, 1988, Association for Computing Machinery.*

"Graphical Procedural Capability," publication of International Business Machines, *IBM Technical Disclosure Bulletin*, vol. 33, No. 11, Apr. 1991, pp. 184–191.

Lazar, B., "ParcPlace–Digitalk's Parts for Java 1.0", *Software Development*, vol. 5, No. 2, Febrary, 1997, pp. 19–26.

Dunn, J., et al., Test Center Comparison: Workflow Solutions—Going with the Flow, *InfoWorld*, vol. 19, Issue 1, Jan. 6, 1997, pp. 52–60.

Mitchell, K., et al., "Test Center Comparison—Document Workflow Solutions, Juggling deeds, deadlines," *InfoWorld*, vol. 19, Issue 4, Jan. 27, 1997, pp. 96–107.

* cited by examiner

*Primary Examiner*—St. John Courtenay, III
*Assistant Examiner*—George L. Opie
(74) *Attorney, Agent, or Firm*—Coats & Bennett, P.L.L.C.

(57) ABSTRACT

A graphical method for sequencing computer control task uses objects to represent the task to be performed by the computer. The objects are placed in a directional field having a directional attribute which specifies how the tasks are to be sequenced. The sequence of tasks to be performed collectively defines a procedure. When the procedure is initiated, the computer automatically sequences the task within the procedure based on the relative special location of the task objects and the directional attribute. The sequence can be modified by changing the relative location of the task objects or by changing the directional attribute.

38 Claims, 20 Drawing Sheets

METHOD OF SEQUENCING COMPUTER CONTROLLED TASKS BASED ON THE RELATIVE SPATIAL LOCATION OF TASK OBJECTS IN A DIRECTIONAL FIELD

This application claims the benefit of U.S. provisional application Ser. No. 60/043,371, filed Apr. 4, 1997.

FIELD OF THE INVENTION

The present invention relates generally to graphical user interfaces for operating a programmed computer and more particularly, to a graphical user interface for sequencing tasks to be performed by the computer.

BACKGROUND OF THE INVENTION

The traditional methods for sequencing a series of tasks is to use a program, script or graphical user interface (GUI). The program or script consists of a series of instructions which tells the computer to perform certain tasks. However, most programming or scripting languages require an understanding of programming methods and of the syntax of the programming language used. Most computer users do not have the time or skill needed to build constructs to make these tools useful. Therefore this approach is not viable for such users. Another problem with this method for sequencing tasks is that one must rewrite the code if it is desired to modify the sequence of tasks.

In GUIs, the tasks to be performed may be represented as objects. After the default behavior of the objects is defined, the user must manually connect the objects to define the sequence of the tasks. The process of sequencing the tasks is typically done by the user manually connecting the objects together in the desired sequence. A problem with this method is that it is time consuming and error prone. For example, many GUI based programs allow the objects to be sequenced by manually selecting a first object referred to as the source object, manually selecting a second object referred to as the target object, and creating a link between the source and target objects. This link typically appears as a line extending between the source object and the target object. This line may also include an arrow to indicate the direction of sequencing. This process is repeated over and over to create a continuous chain, where the previous target object becomes the source object with the new object chosen as the target. Once constructed, the entire sequence or chain may be triggered and the underlying tasks executed in the order specified by the user.

This approach towards task sequencing is described in "Graphical Procedural Capability," IBM Technical Disclosure Bulletin (April 1991, Vol. 33, No. 11). This article typifies the general means of connecting iconic representations of objects and sequencing their corresponding task(s) in a graphical user interface. Many software programs commonly referred to as Rapid Application Development (RAD) programs and many productivity tools for program creation use this approach. Examples of these productivity tools and strategies for their use may be found in "Rapid Development: Taming Wild Software Schedules" by Steve McConnell, Microsoft Press (1996) and "Workflow Strategies" by James Koblielus, IDG Books Worldwide Inc. (1997).

One inherent problem with this approach is revealed as the number of objects comprising any sequence grows large. Since the prior art approach requires that associations or links between objects constituting the sequence be determined by the user taking some action to explicitly associate and link one object to the next, any re-ordering that requires removal of existing links or the creation of new ones becomes very time consuming and prone to error. There is often a need to modify a complex sequence of tasks, to meet the rapidly changing needs of the user or organization for which it was developed. If the user reassigns the sequence of any one of the linked objects in the sequence, it may affect subsequent tasks or links which are dependent on the object being moved. That is, the sequencing of certain objects may be dependent on the execution of a task by some previous object. In such cases, the user must also make changes to all subsequent dependent links in order for the resequencing of objects to achieve the desired result. This is extremely time consuming and error prone in prior art programs.

Another problem with the prior art approach to task sequencing concerns the sheer amount of information displayed to the user as the number of objects and their associated links become large. With such a large number of objects, the user easily becomes overwhelmed by the density of visual information. Some prior art programs have attempted to solve this problem by allowing the user to selectively hide certain links (See, for example, Lazar, "HELLO, WORLD! ParcPlace—Digitalk's Parts for Java 1.0," Software Development, February 1997). None, however, provide a method for resequencing objects or links which have been hidden.

In prior art programs for work flow or task sequencing, there is no correlation between the position of a task object in the graphical user interface and the order of tasks in the sequence. This lack of correlation can be confusing to the end user. Virtually all people, regardless of cultural background share an innate understanding of patterns. Prior art programs do not take advantage of people's innate understanding of patterns which can make these programs more difficult to learn and use.

Accordingly, there is a need for an improved graphical user interface for sequencing computer controlled tasks in a more efficient and less time consuming manner.

SUMMARY OF THE INVENTION

The present invention provides a graphical method for sequencing computer controlled tasks. According to the present invention, the tasks which are controlled by the computer are represented as objects in a graphical user interface. The task objects are placed by the user in a directional field in the user interface. The directional field includes a directional attribute which is represented in the user interface by a directional indicator. The directional attribute specifies how the order of the tasks within the field is determined. The tasks are automatically sequenced by the computer when the sequence is executed based on the relative location of the objects in the directional field with respect to one another and the directional attribute of the directional field. The user does not need to explicitly link one object to another. Instead, links are created dynamically when the sequence is executed.

The user can modify the sequence of tasks in one of two ways. First, the sequence of tasks can be changed by moving objects in the directional field so that the relative location of the objects is changed. Second the directional attribute of the directional field can be changed to change the sequence. The links between objects will by dynamically re-created the next time the sequence is executed.

In the preferred embodiment of the invention, links between objects are drawn on the screen as the sequence is executed. The links appear in the interface as a line connecting two objects together. The links form geometric patterns which provide information regarding the nature of the underlying sequence, irrespective of the particular application any individual, organization or group chooses to use. For example, the pattern reflects both the ordering of tasks comprising the sequence and the spatial preferences of the individual user who created the sequence.

These patterns draw on man's common innate ability to perceive and recognize patterns. Man's innate pattern recognition ability provides a basis for a uniform methodology for creating systems to order a sequence of operations. A knowledgeable user moving from one work environment to another, such as from research to accounting, could become productive faster since the patterns represent information that is loosely coupled with the underlying sequence tasks. Also, if additional objects are placed within an existing sequence, the user will intuitively know how that object will be incorporated into the chain without the need to manually draw links connecting the new object to existing objects. The advantages of such a system are many. Not only does such a system provide consistent reliable information in the form of the geometric patterns which naturally result from the sequencing, but it allows meaning to be passed among individuals without the need for common language or shared cultural background.

By creating a system for interacting with computers which is more natural to man, it follows that we stand to gain improvements in usage of the computer. The directional field indicator permits the knowledgeable user to intuitively estimate the proper placement of objects within the directional field to achieve the desired result. The user does not need to explicitly create a link between objects. Instead, the links will be created dynamically when the sequence is executed. Eliminating the need to explicitly create links between objects makes sequence creation more efficient. Just as important, eliminating the need to explicitly create links allows the user to focus attention on the overall sequence.

A primary advantage of the present invention is the improvement in efficiency in creating complex sequences of tasks. There is no longer any need to manually create or modify sequences as was the case with prior art programs. A knowledgeable user of any skill level, whether a novice or an experienced user, can quickly and easily modify sequences by rearranging the objects in the directional field. Since the user does not need to explicitly define links between objects, fewer actions are required.

Another advantage of the present invention lies in the loose coupling of the spatial arrangements of objects in the user interface and the resulting geometric patterns which are formed by lines connecting the objects together. These geometric patterns provide the user with information regarding the nature of the underlying sequence, irrespective of the particular application in use. The user can readily interpret the meaning of the pattern without the necessity for prerequisite knowledge of the context in which the application was originally constructed. Also, the user can easily transfer patterns from one environment to the next without spending time and energy gaining expertise in the particular program in which its original pattern was constructed. A knowledgeable user, moving from one program to another, can become productive, faster and without the need for retraining to learn the nuances of the new program.

Another advantage is that the present invention allows expertise to be transferred via task sequence patterns. The geometric patterns have meaning to those within knowledge of the context in which it was created. Therefore, a knowledgeable user can more easily understand and modify sequences created by another.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

DETAILED DESCRIPTION OF THE INVENTION

Figure 1:
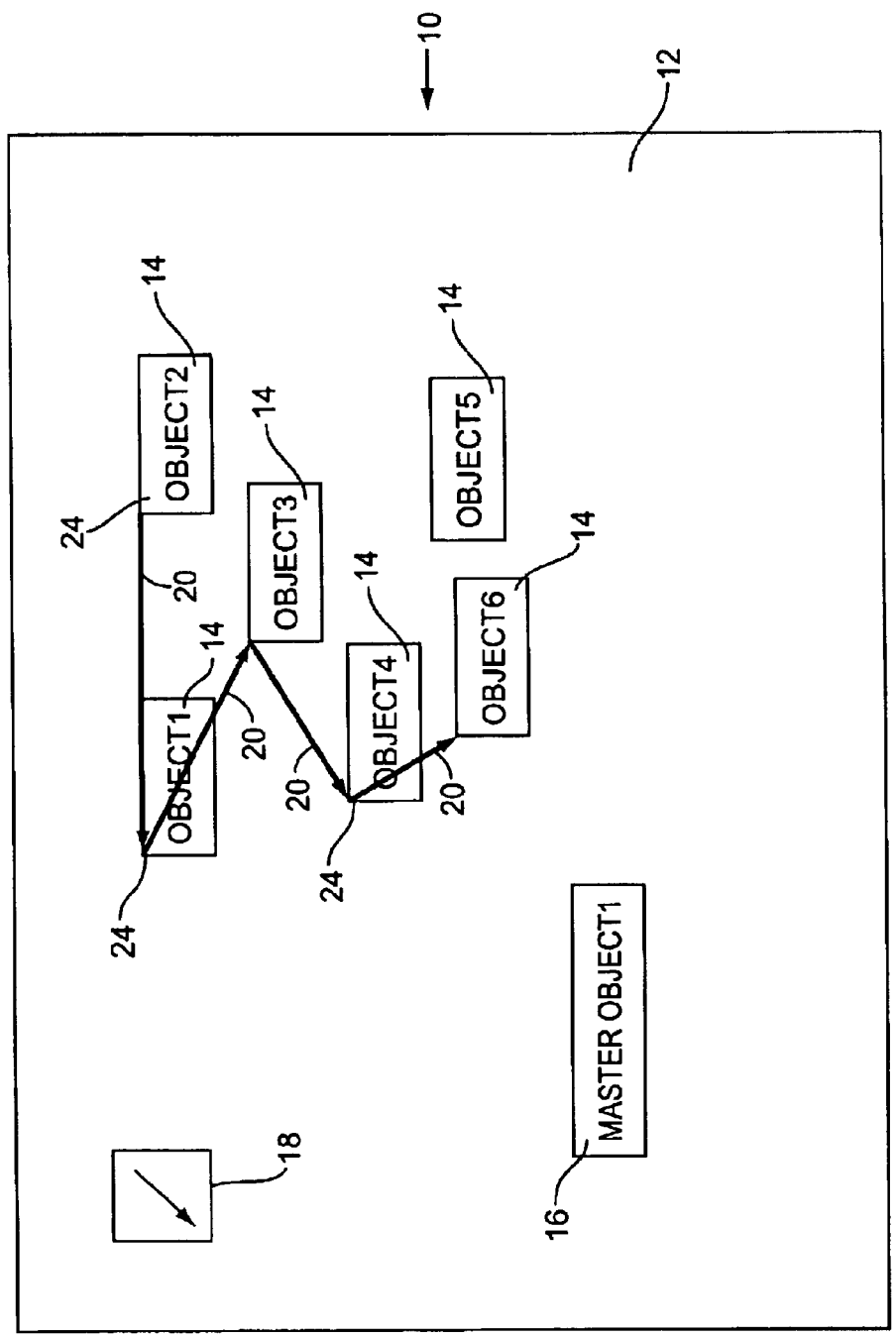
FIG. 1 illustrates a plurality of task objects and a single master object arranged in a directional field having its directional attribute set to UPPER RIGHT TO LOWER LEFT.

Referring now to the drawings and particularly to FIG. 1, the method of sequencing computer controlled tasks of the present invention will be described in greater detail. As shown in FIG. 1, the method is implemented through a user interface 10 in which the computer controlled tasks are graphically represented as task objects 14 in a spatial field 12 on a computer display. The tasks are automatically sequenced by the computer based on the relative location of the task objects 14 in the spatial field 12. The spatial field 12 includes a directional attribute which specifies how the order of the tasks is determined. To implement the process, the user creates task objects and places the task objects in the spatial field 12. The task objects 14 represent specific tasks in a sequence or procedure. Task objects may be represented as push-buttons or as icons which inform the user of the task associated with the particular object instance.

Once a task object 14 is created or instantiated, its default behavior or functionality is set by the user. The behavior of the task object 14 may, for example, be set through property sheets which provide access to the various properties and methods which are encapsulated by the task object. By setting or changing the properties of the task object 14, the user can specify the functions or tasks which the task object 14 performs. A task object 14 may represent virtually any task which can be performed or controlled by a computer. For example, a task object 14 may be used to execute other programs on the computer and to send keystrokes to the application. For now, it is sufficient to understand that properties affecting the basic functionality of the task objects 14 are accessible to the user, once the object has been instantiated.

Figure 2:
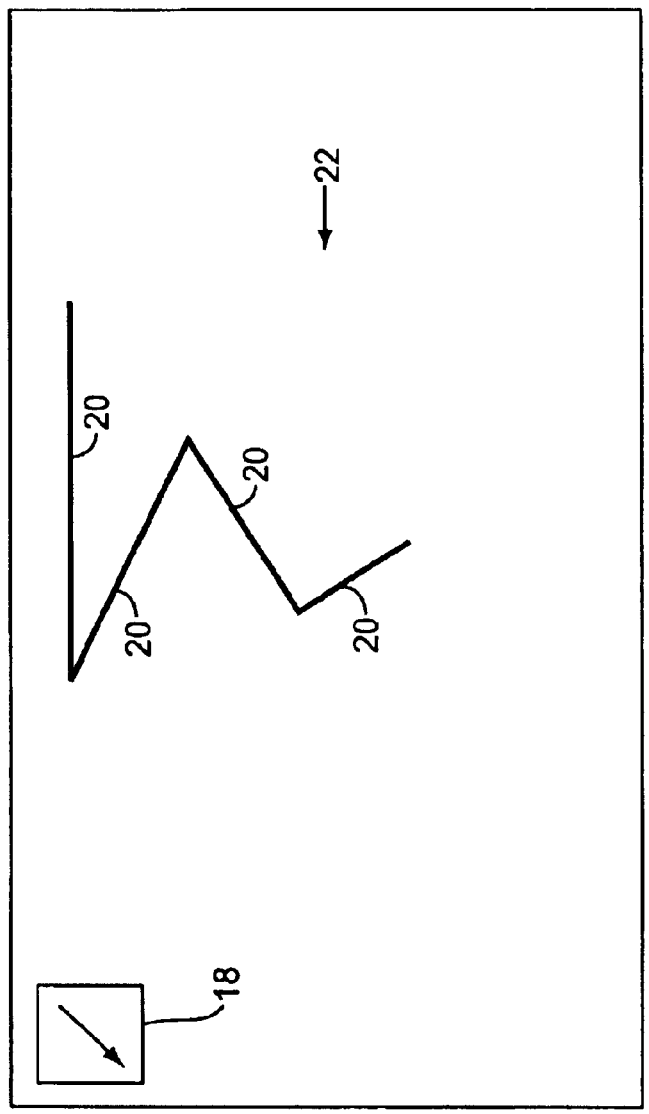
FIG. 2 is an illustration of the task sequence pattern produced by the arrangement of objects in FIG. 1.

A computer-controlled process or procedure will typically include multiple tasks which are represented as a series of task objects 14 in the user interface. The tasks represented as task objects 14 are sequenced and performed automatically by the computer. As each task is performed, a line known as a sequence line 20 may be drawn between each task object 14 in the sequence. The sequence lines 20 extend between points on the objects referred to herein as the object location point 24. In the examples given, the object location point 24 lies on the upper left corner of each of the objects in the user interface 10. The object location point 24 could, however, be placed in a location external to the object. The object location point 24, whether internal or external, is used by the computer to determine the sequence of the task objects 14. That is, it is the position of the object location point 24 which is used to determine the sequencing of objects. When the sequence is initiated, sequence lines 20 are drawn from the object location point 24 of one task object 14 to the object location point 24 of the next task object 14 in the sequence. Thus, it will be readily apparent that the sequence lines 20 also serve as a form of progress indicator. As indicated in FIG. 2, the sequence lines 20 form a pattern referred to herein as the task sequence pattern 22.

The user can sequence the computer controlled tasks in one of two ways. First, the sequence of tasks can be changed by moving the corresponding task objects 14 in the spatial field 12 to a new location. That is, the tasks' relative position in the sequence can be changed by simply moving the iconic representation of the task (i.e., task object) in the spatial field 12. The computer automatically re-sequences the tasks whenever one of the task objects 14 is moved in the spatial field 12 without the user having to explicitly re-link the object.

The second way to change the sequence of tasks is to change the directional attribute of the spatial field 12. The directional attribute specifies how the tasks are sequenced based on their location in the spatial field 12. For example, in a two-dimensional spatial field 12, a directional attribute could specify that tasks are sequenced from top-right-to-bottom-left based on the corresponding task object's location in the spatial field 12. If the directional attribute were changed to specify a bottom-right-to-top-left sequence, the order of tasks would change even though the task objects 14 all remain in the same location. In the present invention, the directional attribute is represented as an icon called the spatial sequence indicator 18 which is displayed on the user interface.

Figure 16:
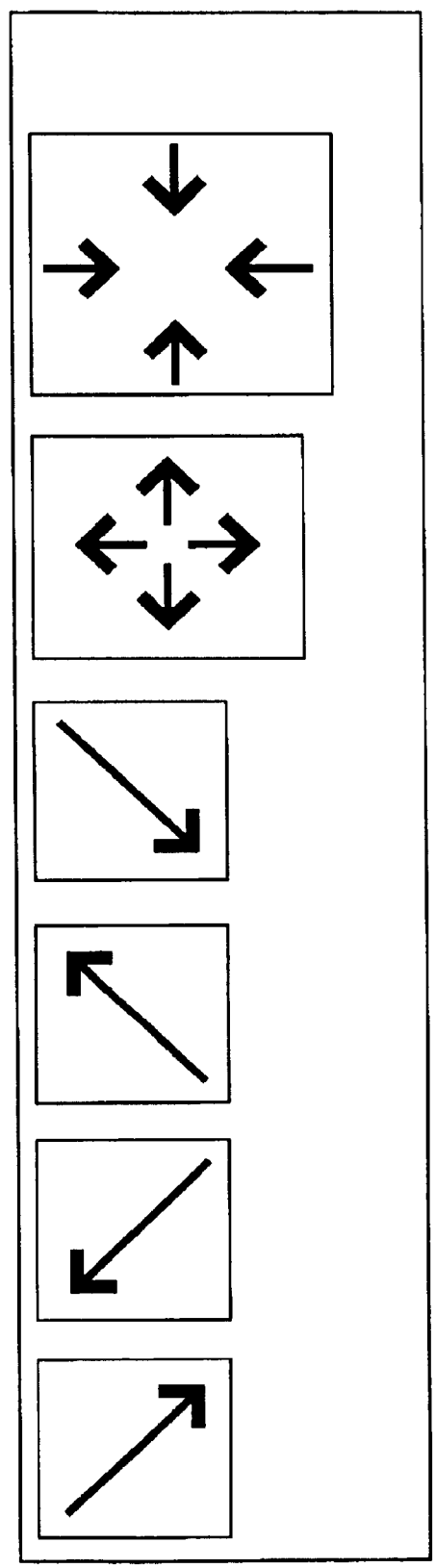
FIG. 16 is an illustration showing the various spatial sequence indicators for a 2-dimensional directional field.

The directional attribute of the spatial field is set by accessing a property sheet, for example, by right clicking in the spatial field 12. The property sheet would allow the user to set properties for the spatial field. One of the properties is the directional attribute of the spatial field. This property specifies how objects placed within the spatial field will be sequenced. In the disclosed 2D embodiment, the directional attribute has six possible settings. Each setting is represented by a different spatial sequence locator which is shown in FIG. 16. The values of the directional attribute include UPPER LEFT TO LOWER RIGHT, LOWER RIGHT TO UPPER LEFT, LOWER LEFT TO UPPER RIGHT, UPPER RIGHT TO LOWER LEFT, CURRENT POSITION OUTWARD, and OUTER MOST POINTS INWARD. The spatial field 12 may also have other attributes such as color or font which can be set by the user.

In FIG. 1, six task objects 14 are placed in a spatial field 12, namely, Object1, Object2, Object3, Object4, Object5, and Object6. The directional attribute specifies a sequencing order of UPPER RIGHT TO LOWER LEFT. In this sequencing order, horizontal position has priority over vertical position. When the process is initiated, the computer performs the tasks represented by the task objects 14 in the spatial field 12. The sequence is initiated by a triggering event. In the preferred embodiment of the invention, a master object 16 is used to trigger the execution of the sequence. A master object 16 is an object whose purpose is to activate the default behavior of one or more task objects 14. In the disclosed embodiment, the master object responds when the master object 16 is "clicked" to initiate the sequence.

The order of the tasks is determined by the task objects' relative location in the spatial field 12 and the directional attribute. In a preferred embodiment of the invention, a sequence line 20 is drawn from one object 14 to the next as each task is performed. Preferably, the sequence line 20 connecting two task objects 14 is drawn when the task represented by the latter object is complete. In the example given, Object2 is performed first followed by Object1, Object3, Object4 and Object6. When the task associated with Object2 is completed, a sequence line 20 is drawn from Object2 to Object1. This process is repeated until the last task in the sequence is completed. The task sequence pattern 22 for the sequence shown in FIG. 1 is illustrated in FIG. 2.

It should be noted in FIG. 1 that Object5 was not included in the sequence. Each task object 14 has a property, called the Inclusion property, which causes the task object 14 to be either included or excluded depending upon the setting of the inclusion property. When the Inclusion property is set to "YES", the object is included in the sequence. Conversely, when the Inclusion property is set to "NO", the object is excluded. The Inclusion property is set through the task object's property sheet.

Figure 3:
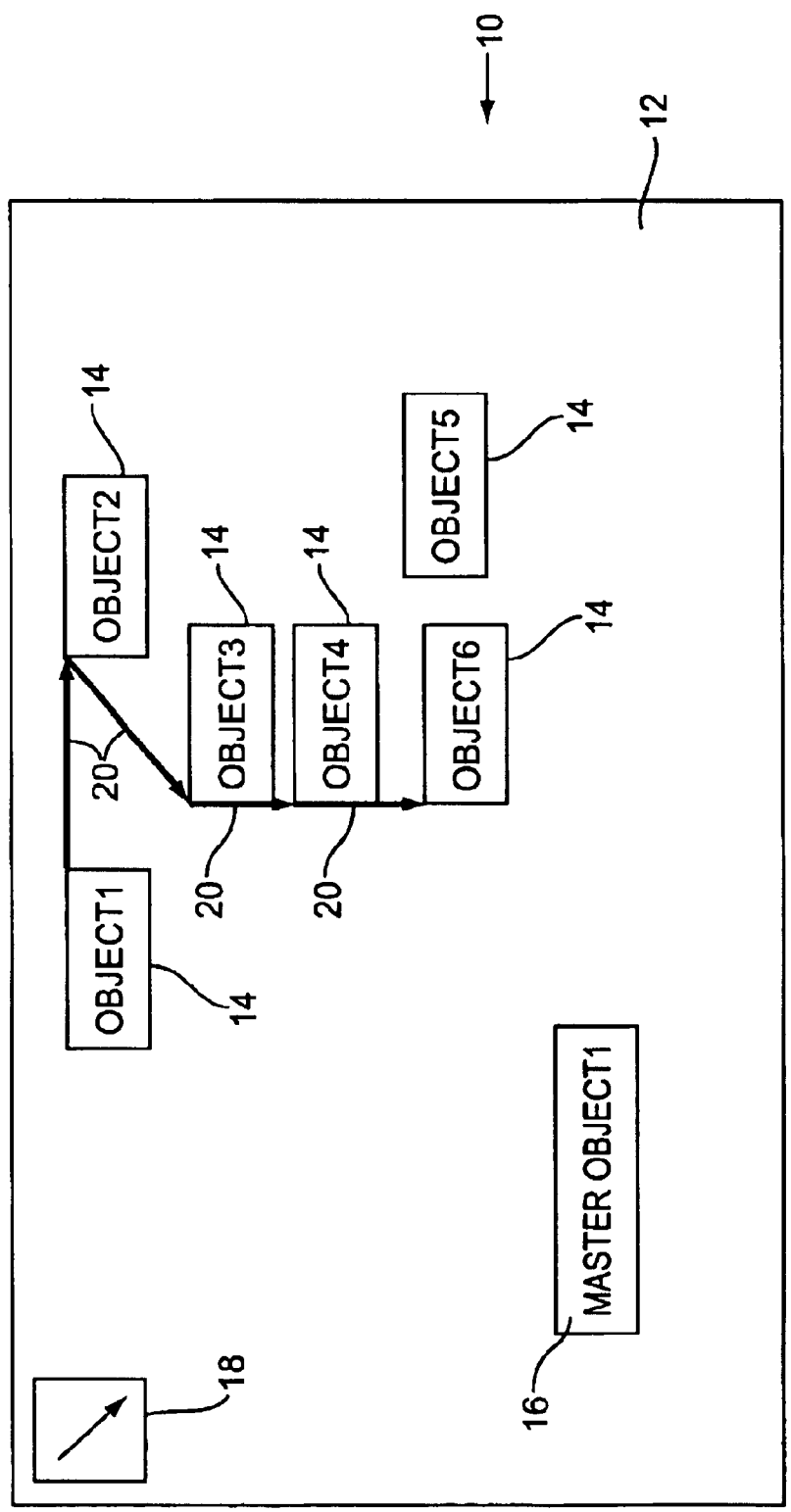
FIG. 3 illustrates the same objects as shown in FIG. 1 wherein one of the task objects has been moved.
Figure 4:
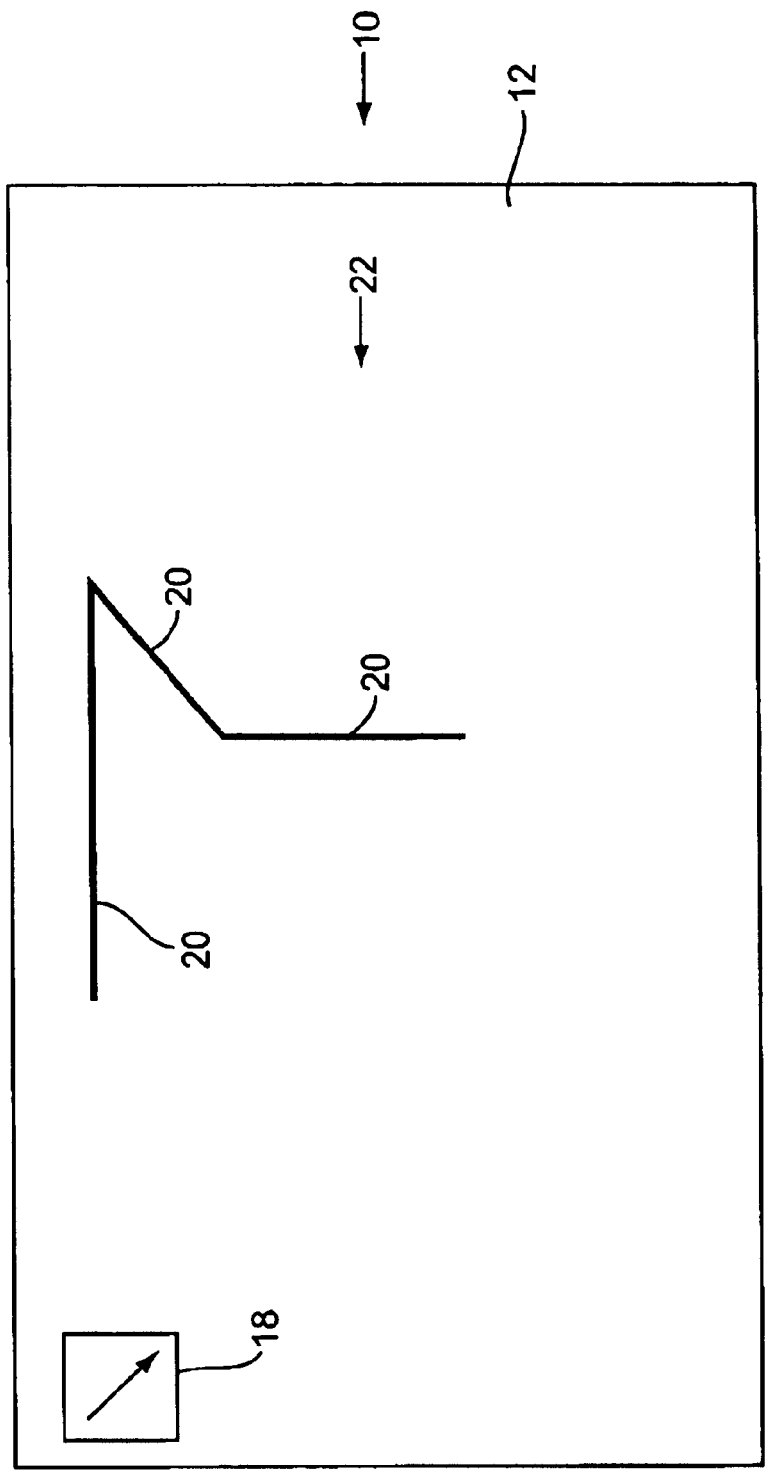
FIG. 4 shows the task sequence for the arrangement of objects shown in FIG. 3.

FIG. 3 shows the same task objects 14 as seen in FIG. 1, however, the relative location of the Object1 has been changed. In this example, the order of execution of the tasks has changed. Specifically, Object2 is performed first followed by Object3, Object4, Object6, and finally Object1. It will be noted also that the task sequence pattern 22 formed as a result, which is shown in FIG. 4, is different from FIG. 1. As the end user works with a particular task sequence pattern 22, a natural association is made by the user between the task sequence pattern 22 and the underlying operations. Once the association is made, the task sequence pattern 22 provides a more intuitive modeling environment.

Figure 5:
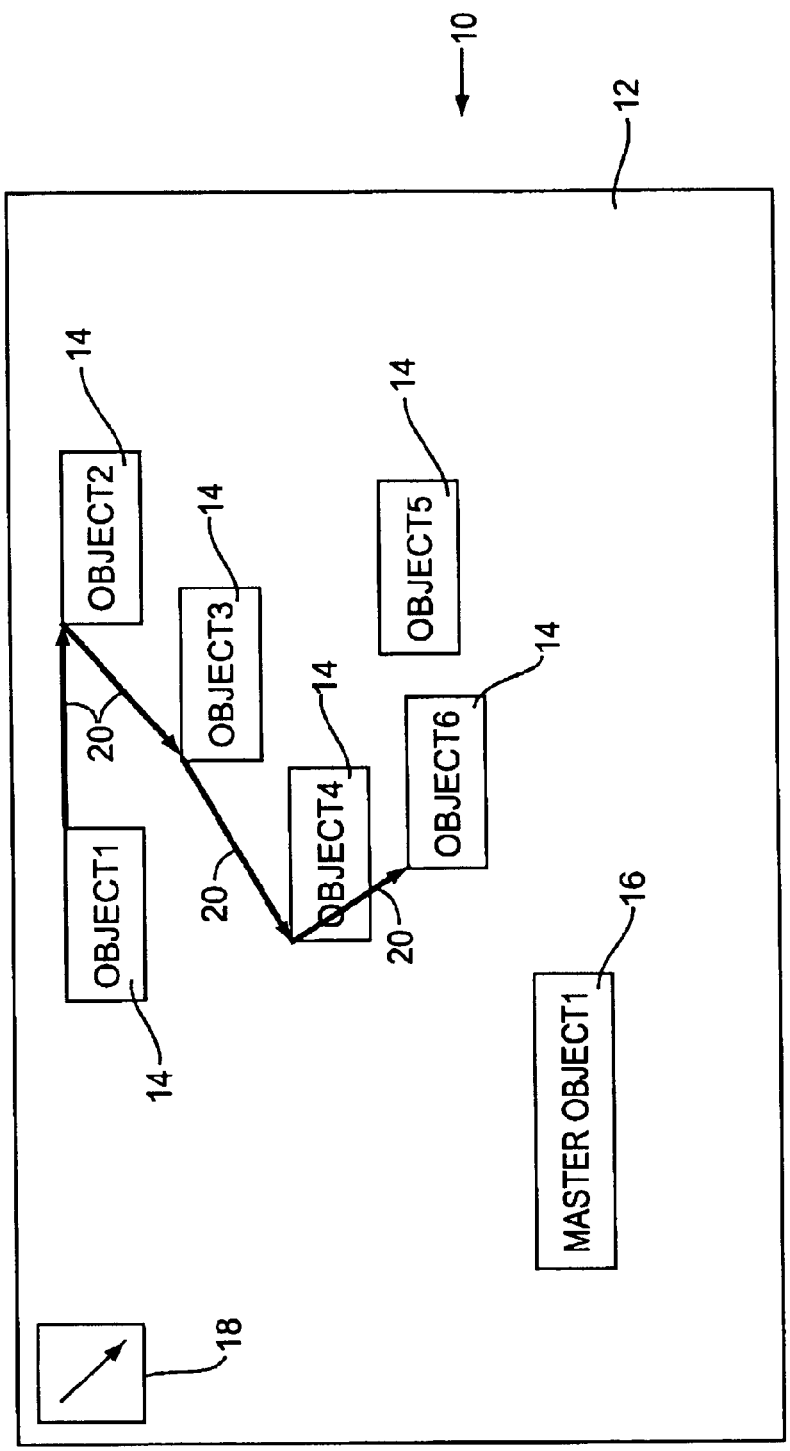
FIG. 5 shows the same objects as shown in FIG. 1 wherein the directional attribute has been changed to UPPER LEFT TO LOWER RIGHT.
Figure 6:
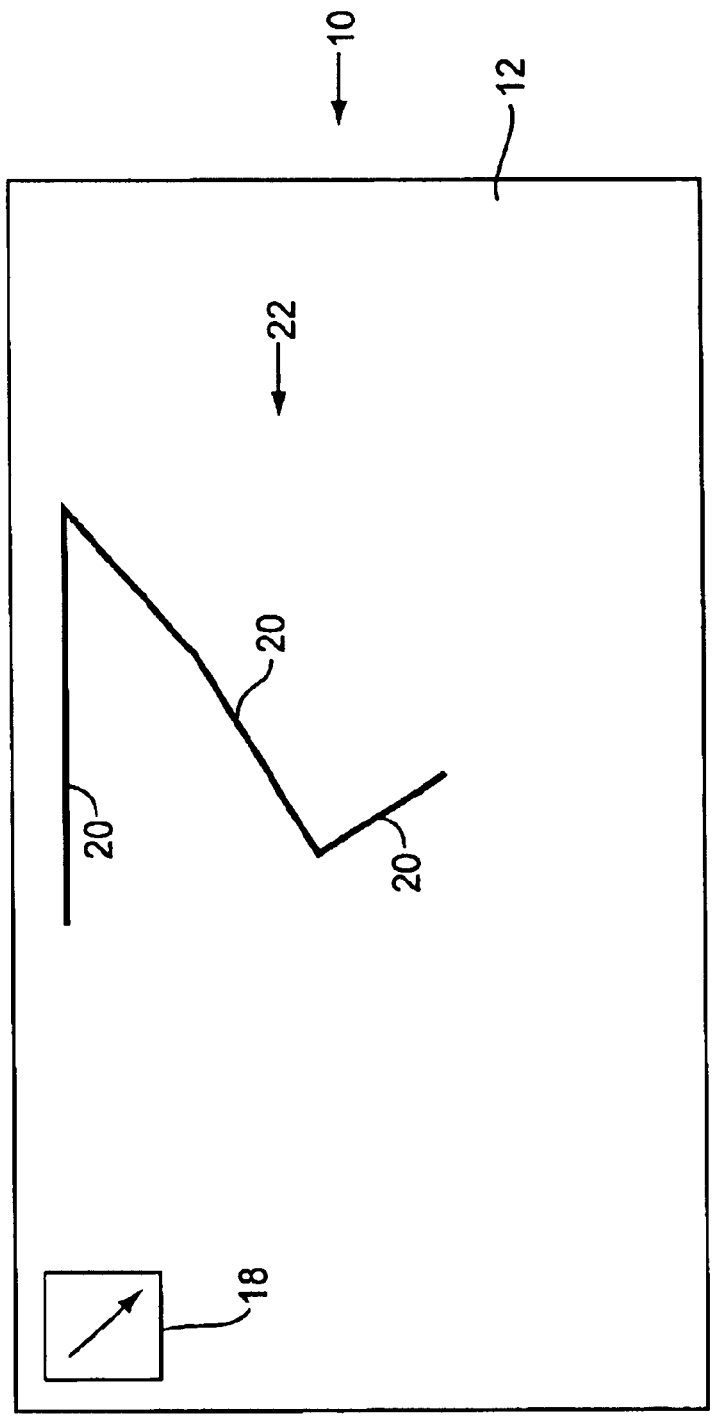
FIG. 6 shows the task sequence pattern for the arrangement of objects shown in FIG. 5.

FIG. 5 shows the same task objects 12 as seen in FIG. 1 in the same locations, however, the directional attribute of the spatial field 12 has been changed to specify an UPPER LEFT TO BOTTOM RIGHT sequence. In this example, the order of execution of the tasks has been affected and a different task sequence pattern 22 results. Specifically, the new sequence begins with Object1, then proceeds to Object2, Object3, Object4, and Object6 in that order. The task sequence pattern 22 for this sequence is shown in FIG. 6. This example demonstrates how the sequence of tasks can be changed without changing the relative locations of the objects in the spatial field 12.

Figure 7:
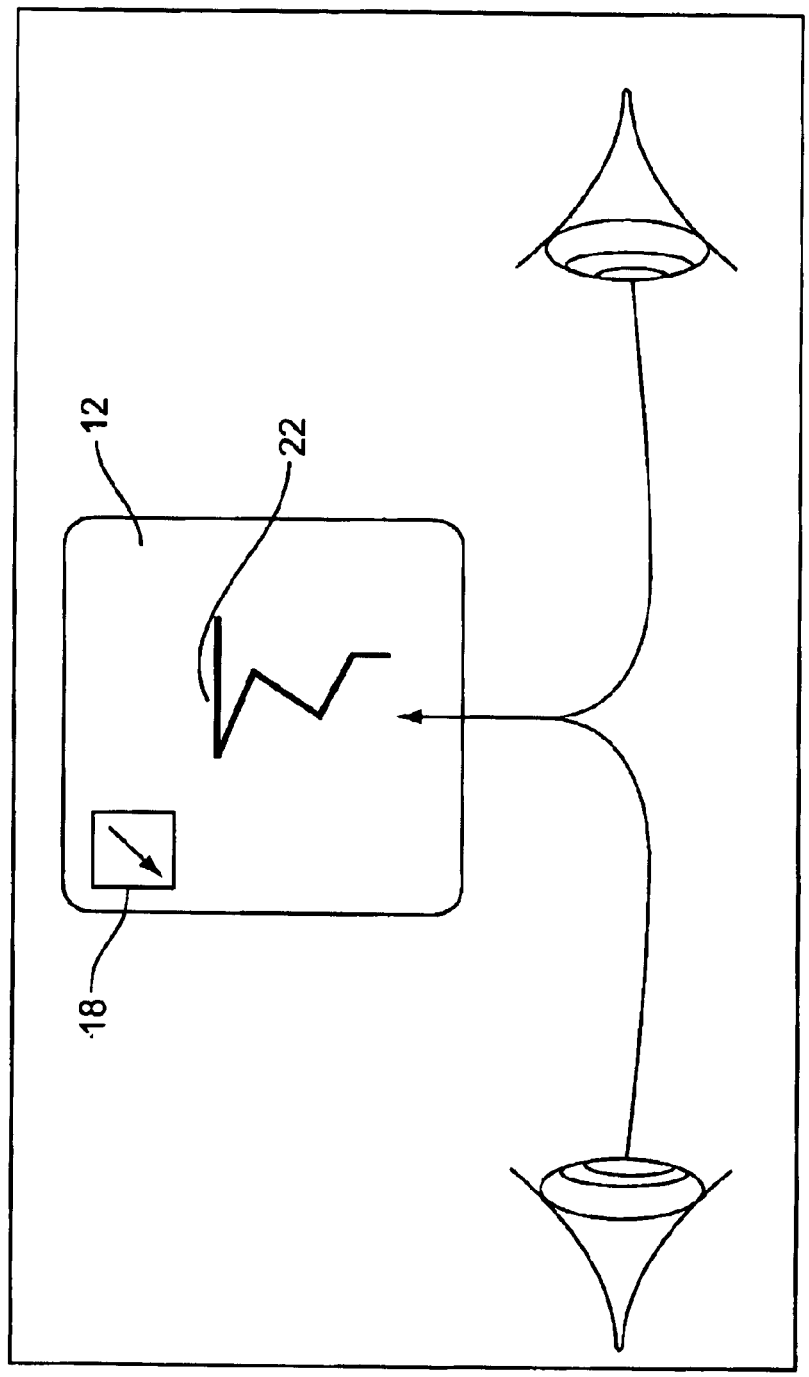
FIG. 7 is an illustration of two viewers observing a task sequence pattern.

An important feature of the present invention is the task sequence patterns 22 which result as the tasks represented by the object are sequenced. The pattern 22, although unique for the particular context in which it was created, hides the underlying complexities of the particular objects and their representation and allows the viewer to concentrate on the sequence itself. By creating a higher, common level of abstraction, the task sequence patterns 22 enable human interaction at a more natural, intuitive level than has been previously known by taking advantage of commonly shared human traits of cognitive perception. FIG. 7 shows two users from varying backgrounds viewing a sequence pattern with the underlying objects hidden. The sequence pattern allows both users to understand and communicate ideas irrespective of cultural differences.

Figure 8:
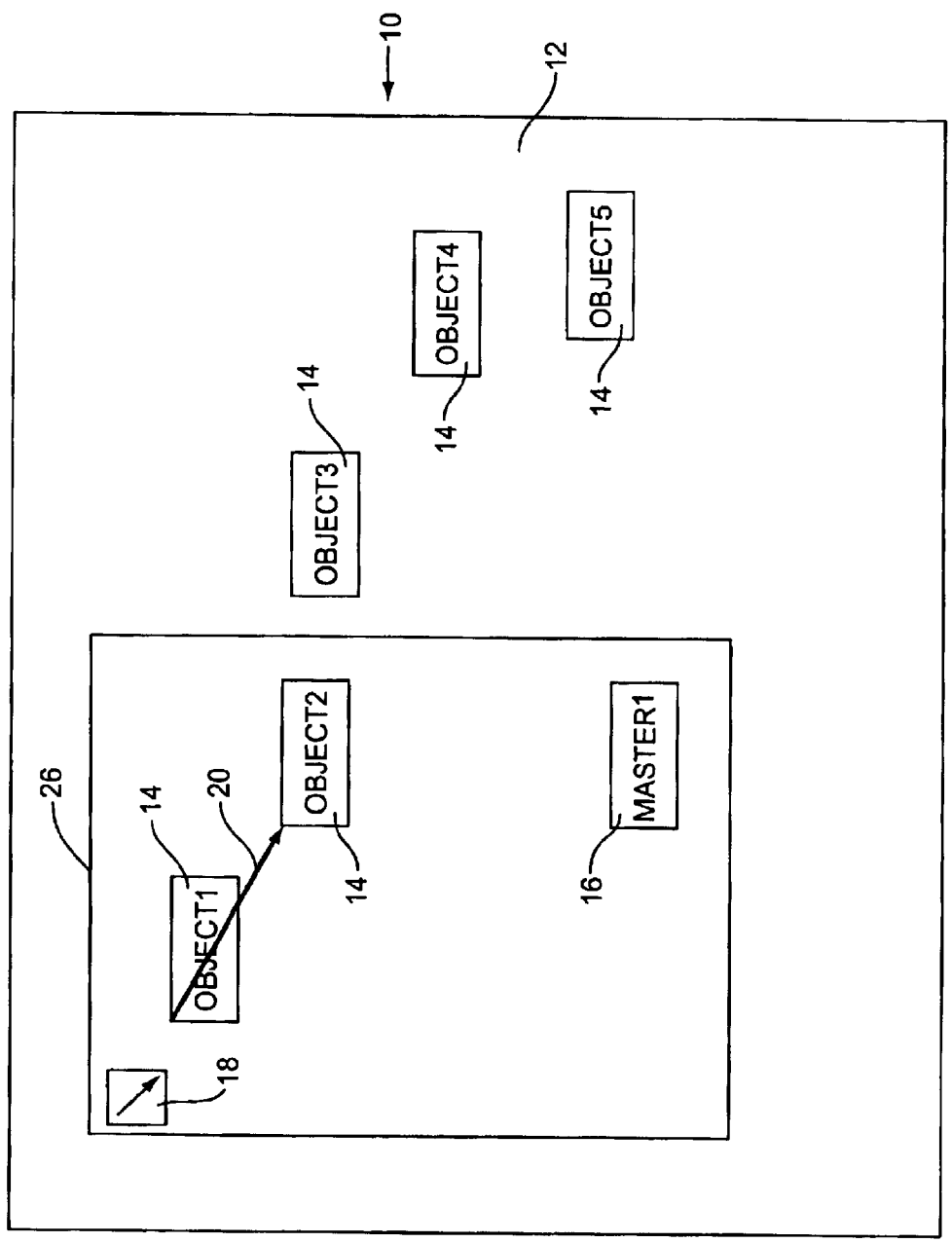
FIG. 8 shows a plurality of task objects and a master object placed in a directional field wherein the master object has a limited region of influence.
Figure 9:
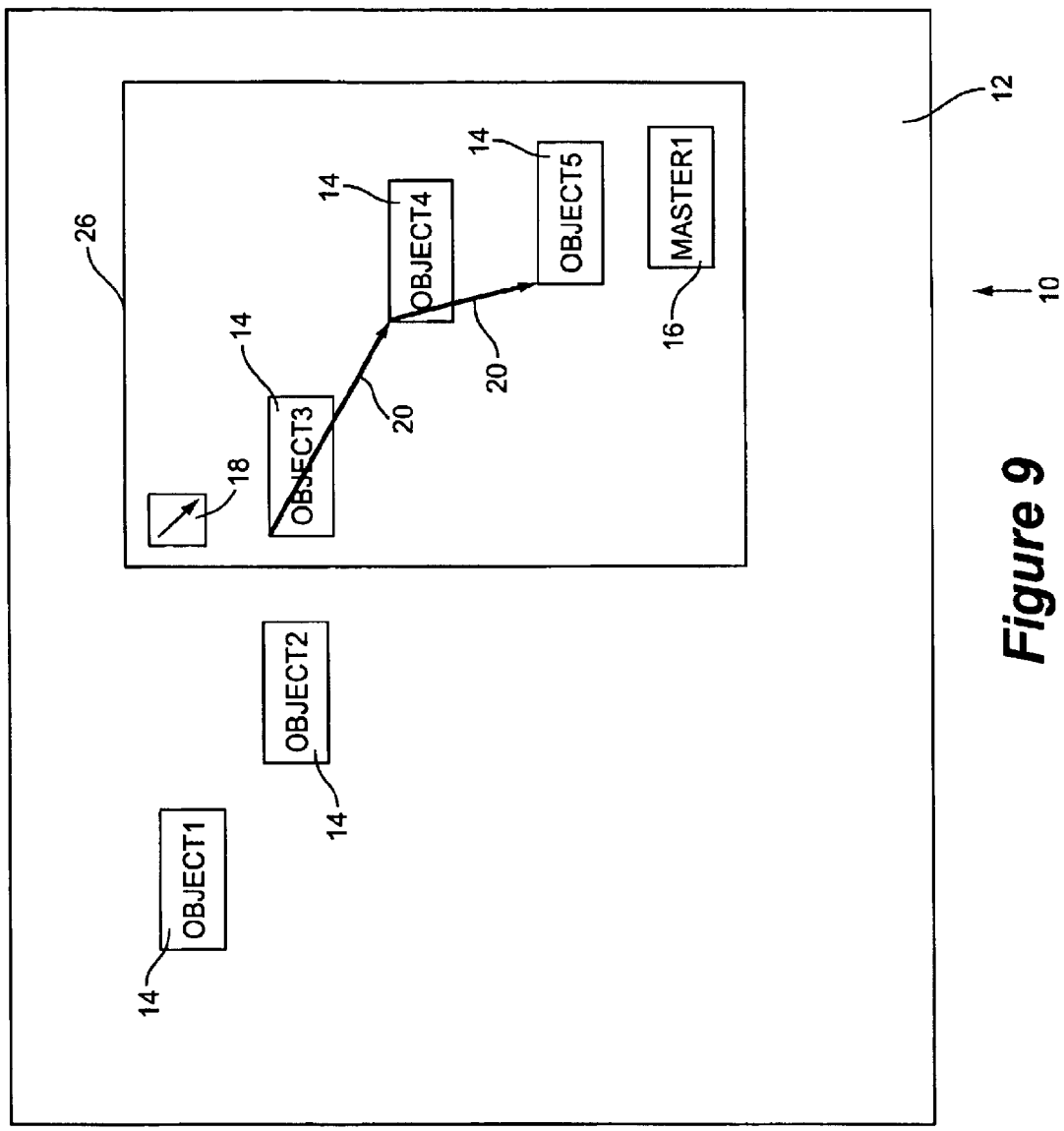
FIG. 9 shows the same task objects and master object as shown in FIG. 8 wherein the master object and its associated region of influence has been moved.

In the preceding discussion, it has been assumed that all of the task objects 14 in the spatial field 12 are controlled by the master object 16. However, in a preferred embodiment of the invention, it is possible to define a region of influence 26 of the master object 16. When the scope of the master object 16 is limited, only those task objects 14 falling within the region of influence 26 of the master object 16 can be controlled by the master object 16. The region of influence 26 of the master object 16 is represented by a boundary line on the computer display. By default, the region of influence 26 is unlimited FIGS. 8 and 9 illustrate how the region of influence 26 can be used in sequencing. In FIG. 8, five task objects 14 and one master object 16 are placed in a spatial field 12. The region of influence 26 of the master object 16 is shown by a boundary line 26 which is visible in the user interface 10. Two task objects 14, namely, Object1 and Object2 fall within the region of influence 26 of the master object 16. Object3, Object4, and Object5 lie outside the region of influence 26 of the master object 16. When the master object 16 is triggered, Object1 and Object2 are included in the sequence. Object3, Object4, and Object5 are excluded since they lie outside of the region of influence 26 of the master object 16.

FIG. 9 shows the same spatial arrangement of task objects 14 as shown in FIG. 8, however the region of influence 26 of the master object 16 has been shifted to the right. By moving the region of influence 26 the tasks represented by Object1 and Object2 are excluded while the tasks represented by Object3, Object4, and Object5 are included. The new order of execution would be Object3, Object4, and Object5.

The method for sequencing computer controlled tasks of the present invention supports multiple master objects 16, each having its own region of influence 26. The present invention also supports interactions between master objects 16. Each master object 16 has properties that can be set by the user. One of the properties already mentioned is the directional attribute. Another property of the master object 16 which can be set by the user is the Mode property. The Mode property specifies the interaction mode between one master object 16 and other master objects 16. In the present invention, three modes are available NONE, CALL OTHER MASTER, and CALL ALL OBJECTS. If the interaction mode is set to NONE, the master object 16 will sequence task objects 14 within its own region of influence 26 and will ignore task objects 14 outside of its own region of influence 26. If the interaction mode is set to CALL OTHER MASTER, then the master object 16 will trigger other master objects 16 which have the Mode property appropriately set once the task objects 14 within its own region of influence 26 are sequenced. The calling master object 16 must be specified by either name or type in the property sheet of the called master object 16. If the interaction mode property is set to CALL ALL OBJECTS, then the master object 16 treats all task objects 14 in the entire spatial field 12 as if they were within its own region of influence 26. In this case, all objects will be sequenced as if the master object 16 had an unlimited scope.

Figure 10:
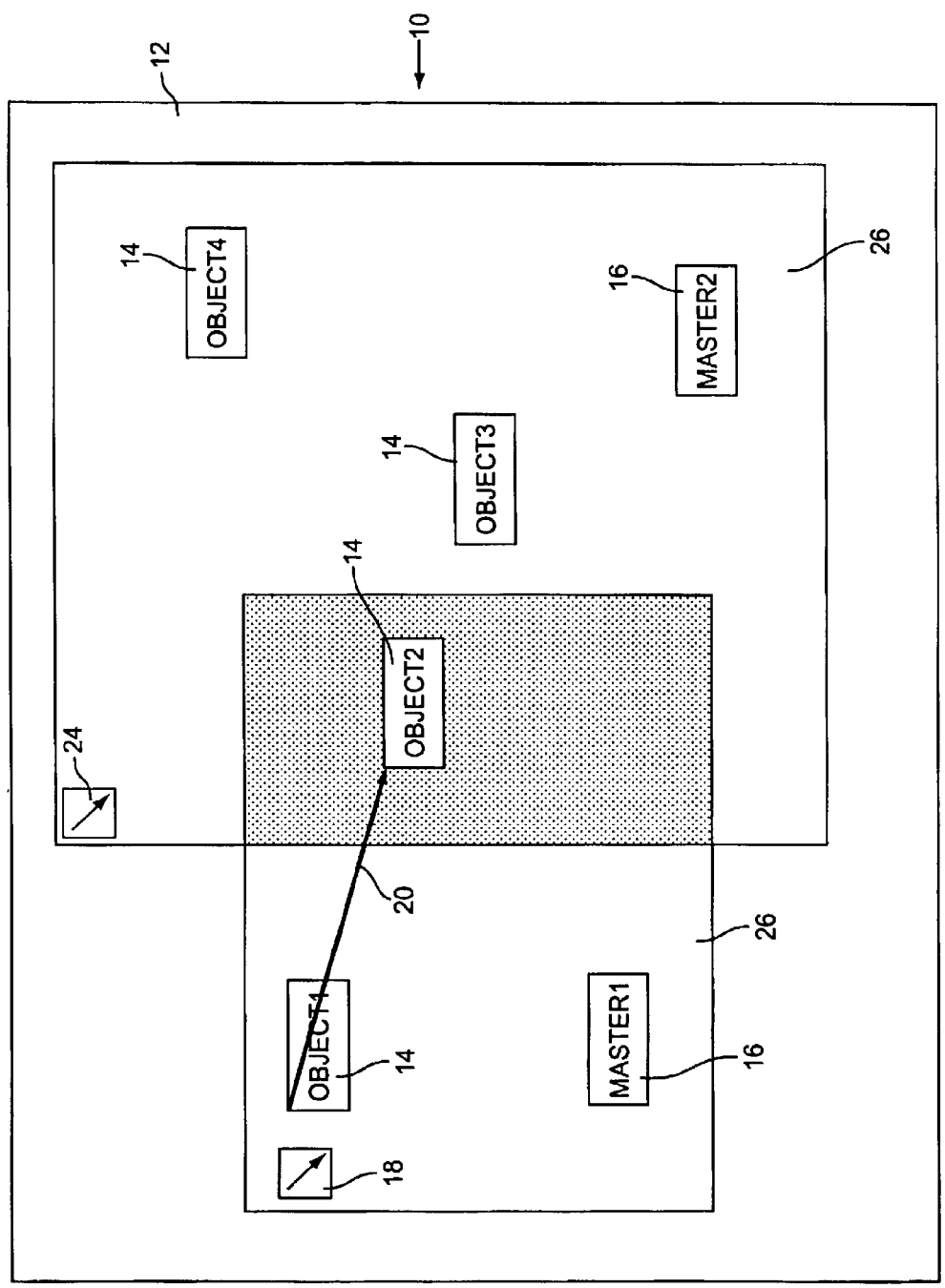
FIG. 10 shows a plurality of task objects and two master objects placed in a directional field wherein each master object has a limited region of influence, and further wherein each limited region of influence has its Interaction property set to NONE.
Figure 11:
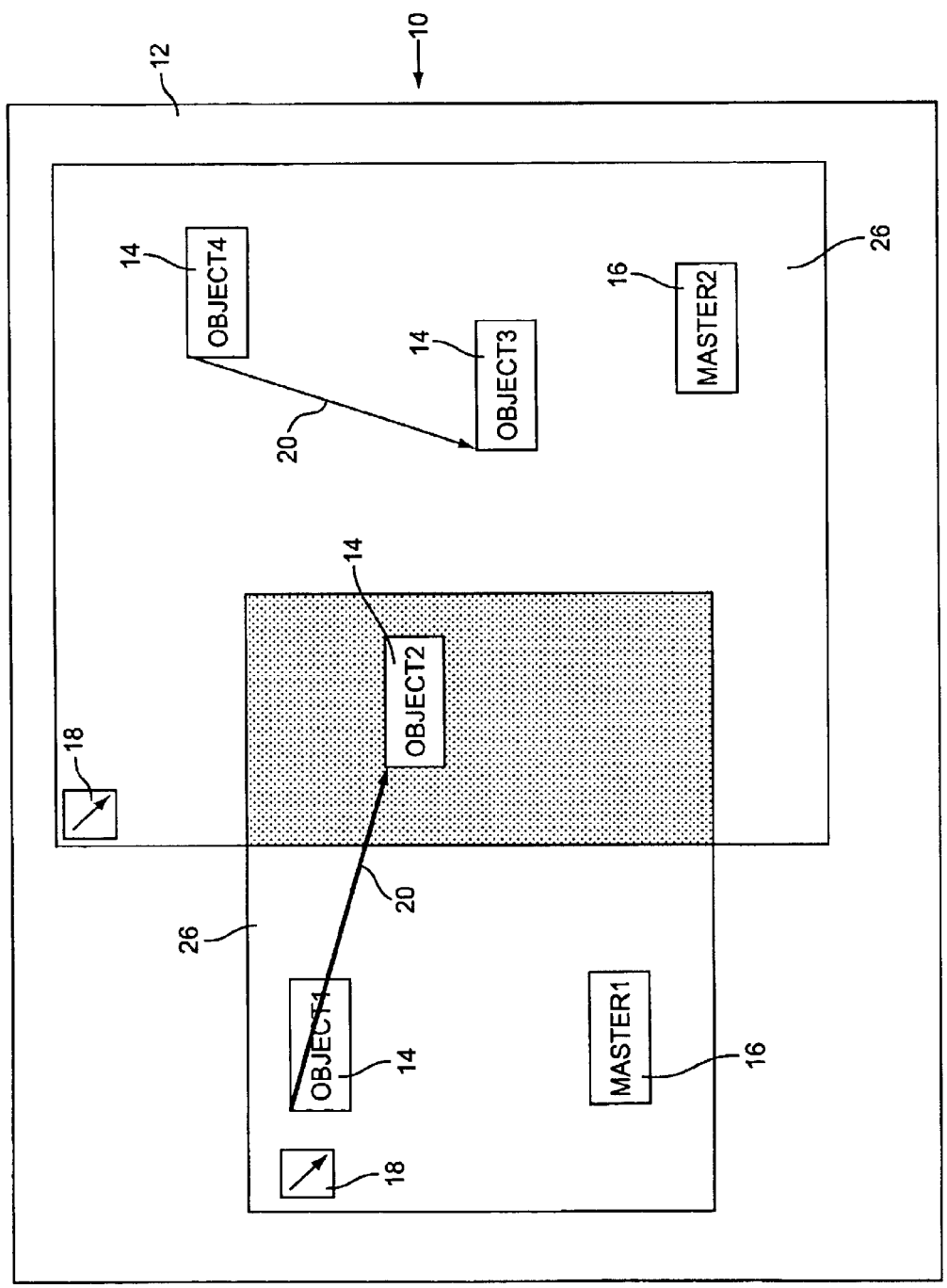
FIG. 11 shows the same task objects and master objects as seen in FIG. 10, however, the Interaction Property of each region of influence of each master object is set to CALL OTHER MASTER.
Figure 12:
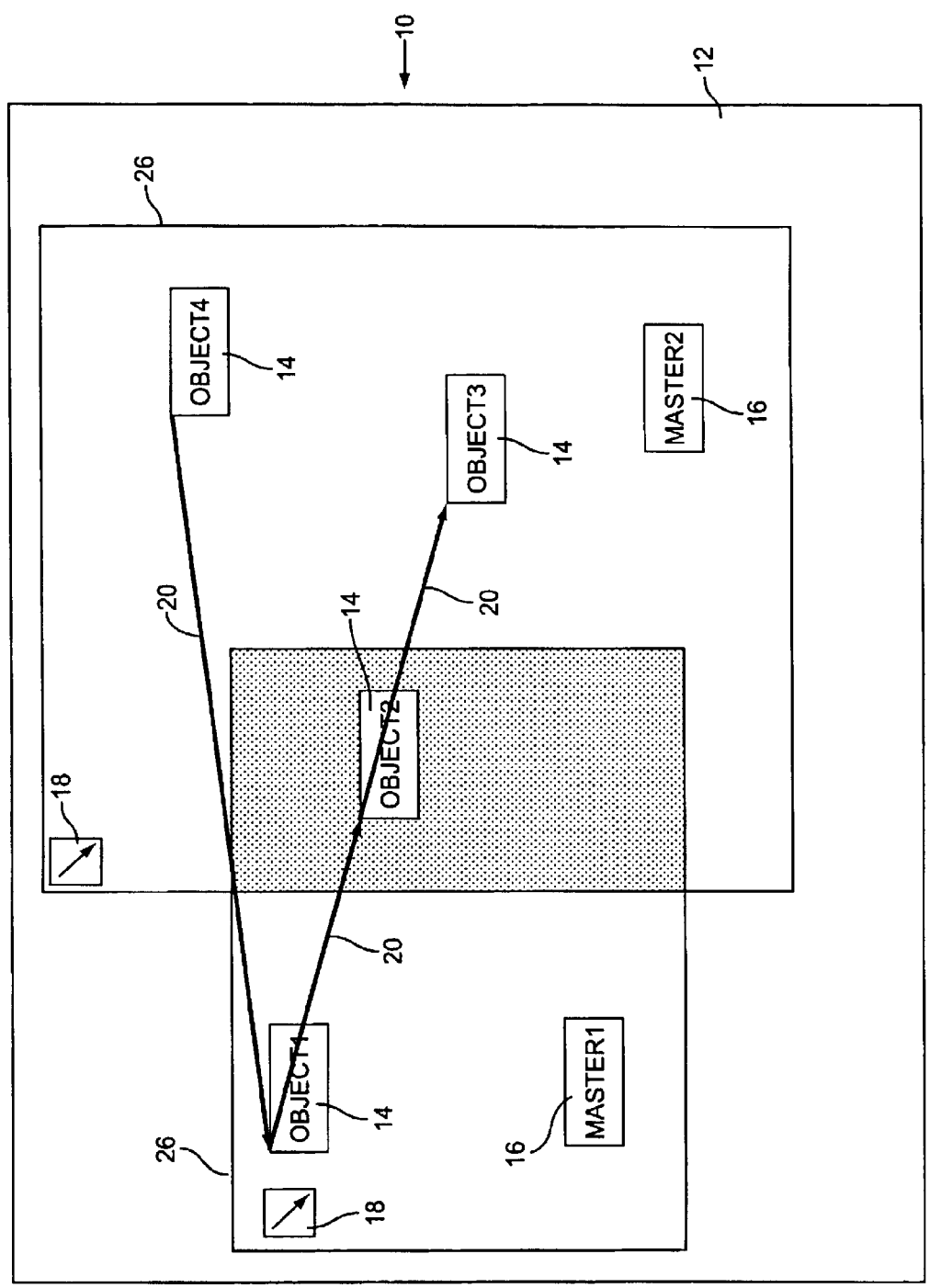
FIG. 12 shows the same task objects and master objects as seen in FIG. 10, however, the Interaction Property of each region of influence is set to CALL ALL OBJECTS.

FIGS. 10–12 illustrate the interaction between different master objects 16. FIG. 10 shows two master objects with intersecting regions of influence 26. Each master object 16 has two task objects 14. Object1 and Object2 belong to Master1. Object3 and Object4 belong to Master2. When the object Master1 is triggered, the tasks represented by Object1 and Object2 are executed. Similarly, when the second master object, Master2, is triggered, the tasks represented by Object3 and Object4 are executed. It should be noted that since Object2 is not triggered by Master2 even though it appears to fall within the region of influence 26 of Master2. This is because Object2 is a child of Master1 and not of Master2.

FIG. 11 shows the same master objects 16 and task objects 14 as seen in FIG. 10. However, the interaction mode property for each master object 16 is set to CALL OTHER MASTER. In this case, when the first master object 16, Master1, is triggered, the tasks represented by Object1 and Object2 are executed. When the first master object 16, Master1, has completed the sequencing of objects within its region of influence 26, it calls the second master object 16, Master2. Note that Master2 must have is Reactivity property set to respond to Master1. Master2 then sequences and executes the processes represented by the objects within its region of influence 26. Specifically, Master2 causes the tasks associated with Object3 and Object4 to be executed.

The CALL OTHER MASTERS property allows master objects to respond to other master objects 16 as if it were a task object 14. All master objects 16 have a Reactivity property which can be set by the user so that one master object 16 will respond to other master types or to a particular master by name. The Reactivity property would identify a particular master object 16 by type or by name to which it will respond. By setting this property, one master object 16 may be called by another master object 16. When a master object 16 has its default behavior triggered by another master object 16 which is on its reactivity list, it is referred to as a servant-master object. The reactivity list serves as a safeguard in large programs in which there may be hundreds of master and task master objects.

FIG. 12 shows the same master objects 16 and task objects 14 seen in FIGS. 10 and 11, however, in FIG. 12 the Mode property of the master objects 16, Master1 and Master2, is set to CALL ALL OBJECTS. In this case, when either master object 16, Master1 or Master2, is executed, all objects in the domain of both master objects 16 will be sequenced as if all the objects belong to a single unlimited region of influence. In this example, the sequence will be Object4, Object1, Object2, and Object3. The same sequence would be triggered no matter which master object 16 began the sequence since both master objects 16 have the same directional attribute. The sequence would change, however, if the directional attribute of Master2 were different from the directional attribute of Master1. Thus, when the interaction property is set to CALL ALL OBJECTS, all task objects 14 are treated as if they belong to a single, unlimited region of influence.

In situations where there are many task objects 14 within a particular region of influence, it may be desirable to execute only a subset of the tasks represented by the task objects 14 in the region. Based on the previous discussion, one way to accomplish this would be to set the Inclusion property of the task objects 14 which the user desires to sequence to YES, and to set the Inclusion property to all other task objects 14 to NO. This process of setting the Inclusion property, however, can be cumbersome when a large number of task objects 14 are involved.

Another solution to the problem is to use objects of different types to represent the tasks to be performed. The default behavior of a master object 16 could be set to sequence only task objects 14 of a particular type. Thus, for each type of task object 14, there would be a corresponding master object 16 to sequence events only of that particular type. A generic master object is used to sequence all objects irrespective of type. In a preferred embodiment of the invention, different types of objects would have a different visual appearance so that they can be readily distinguished by the end user.

Figure 13:
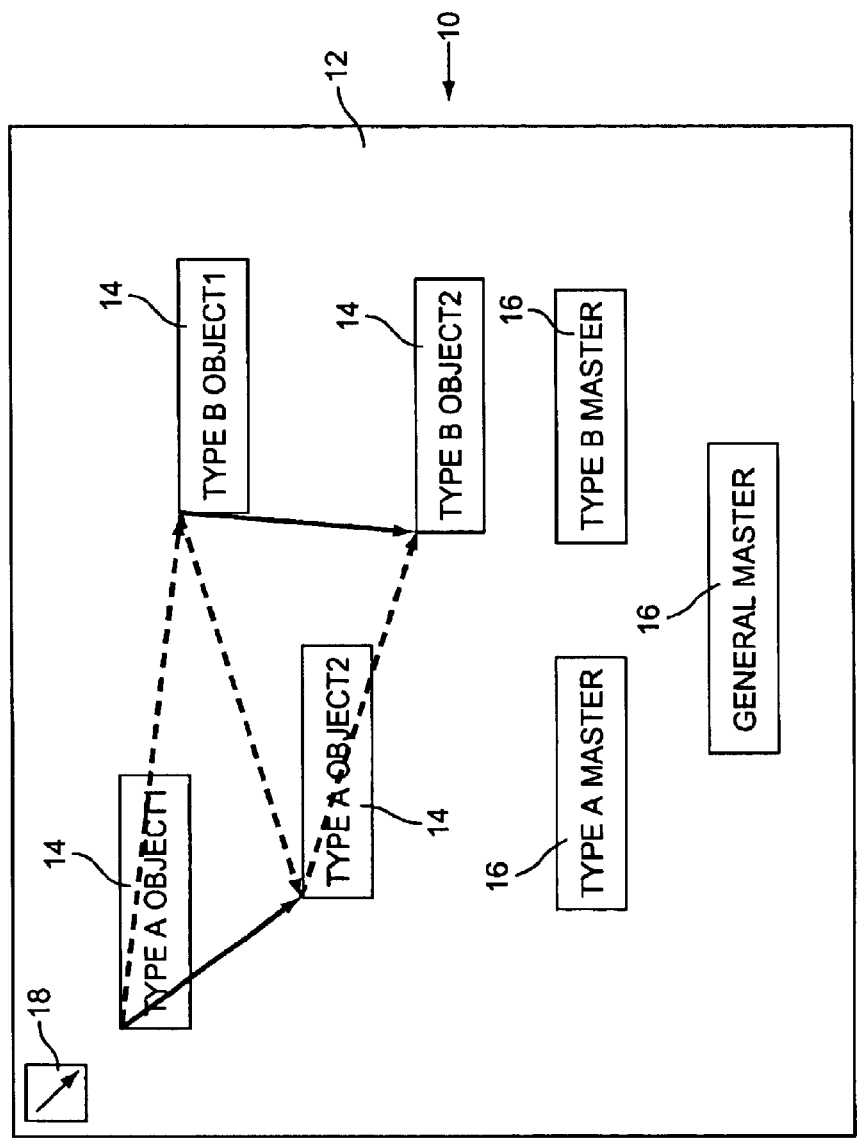
FIG. 13 shows a plurality of task objects of different types and a plurality of type specific master objects placed in a directional field.

FIG. 13 illustrates how objects of different types could be used to sequence tasks. FIG. 13 shows four task objects 14 and three master objects 16. The task objects 14 are of two types—Type A and Type B. There are two generic masters, and a General master. When the Type A generic master object is clicked, only the Type A objects are sequenced. Specifically, Type-A-Object1 and Type-A-Object2 are sequenced. Similarly, when the Type B generic master object is clicked, only Type B objects are sequenced, namely, Type-B-Object1 and Type-B-Object2. However, when the General master object is clicked, the object type is ignored and all task objects 14 are sequenced. In this case, the sequence is Type-A-Object1, Type-B-Object1, Type-A-Object2, and Type-B-Object2. In situations where there are many objects of mixed type, it is convenient to have the ability to sequence only certain types of objects without the need to change the location of objects or to delete existing objects or to change the Inclusion state of the objects.

Figure 14:
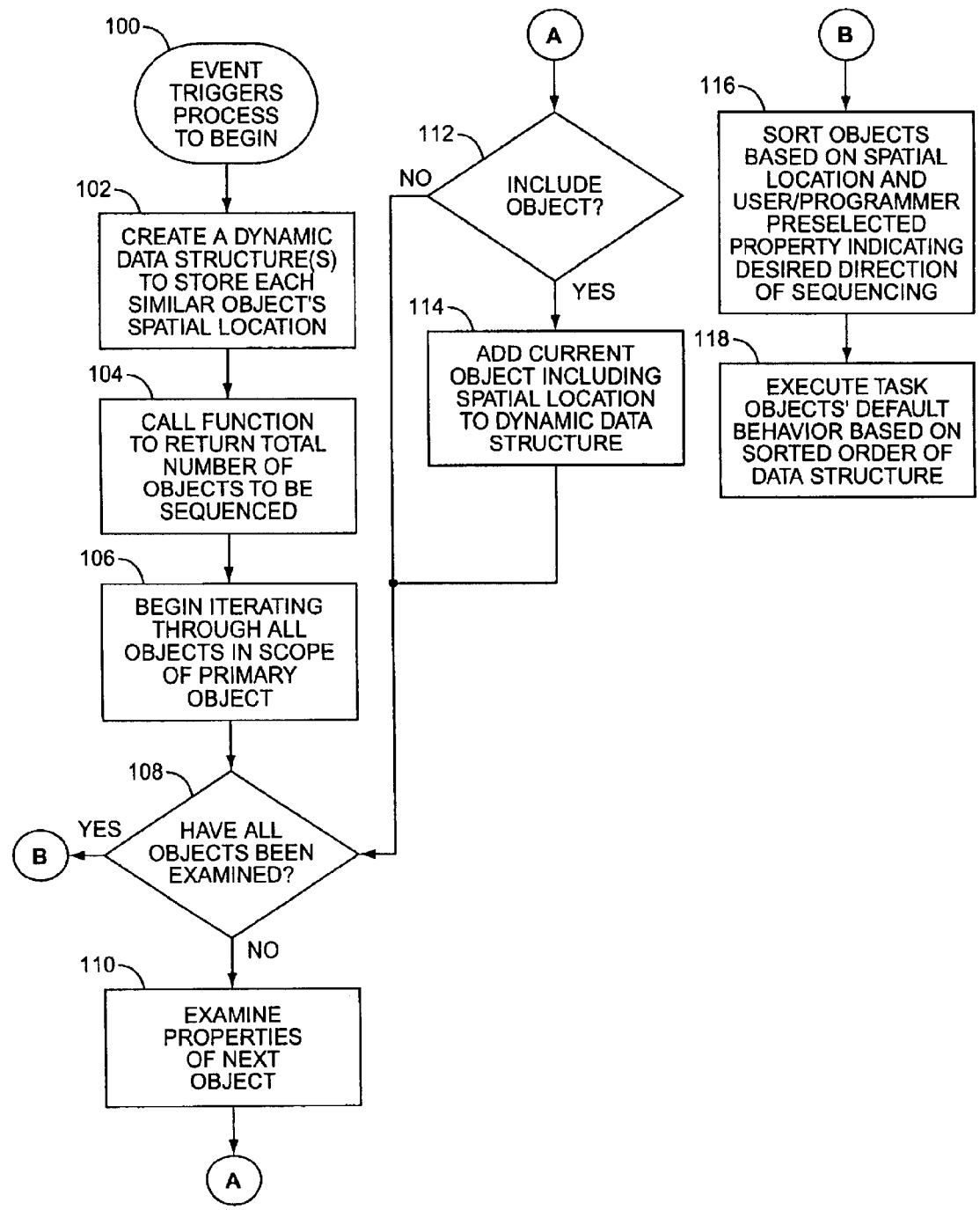
FIG. 14 is a flow diagram describing the sequencing method of the present invention.

FIG. 14 is a flow diagram illustrating the process by which the computer sequences tasks represented as task objects 14 in the user interface. The process is normally triggered by an event (block 100). In the described embodiment, the event triggers the default behavior of a master object 16. However, it will be apparent to those skilled in the art that master objects 16 are not an essential part of the triggering process. Other techniques may be used to trigger the sequence such as timer events or external input. A dynamic data structure is created (block 102) to store information about the objects in the user interface. The information stored would include the location of the objects. After creating the dynamic data structure, a function is called to return the number of objects to be sequenced (block 104). The computer then iterates through all the task objects 14 within the region of influence 26, the master object 16 (block 106). After each iteration, the computer determines whether all objects have been examined (block 108). If not, the properties of the next object is examined (block 110). Based on the properties of the object, the computer determines whether to include the particular object in the sequence (block 112). If the object is to be included, the object is added to the dynamic data structure (block 114). After all objects have been examined, the objects listed in the dynamic data structure are sorted based on the spatial location of the objects and the directional attribute of the master object 16 (block 116). After sorting is complete, the objects execute their assigned tasks in sequence (block 118). After all tasks have been completed, the process ends.

Figure 15:
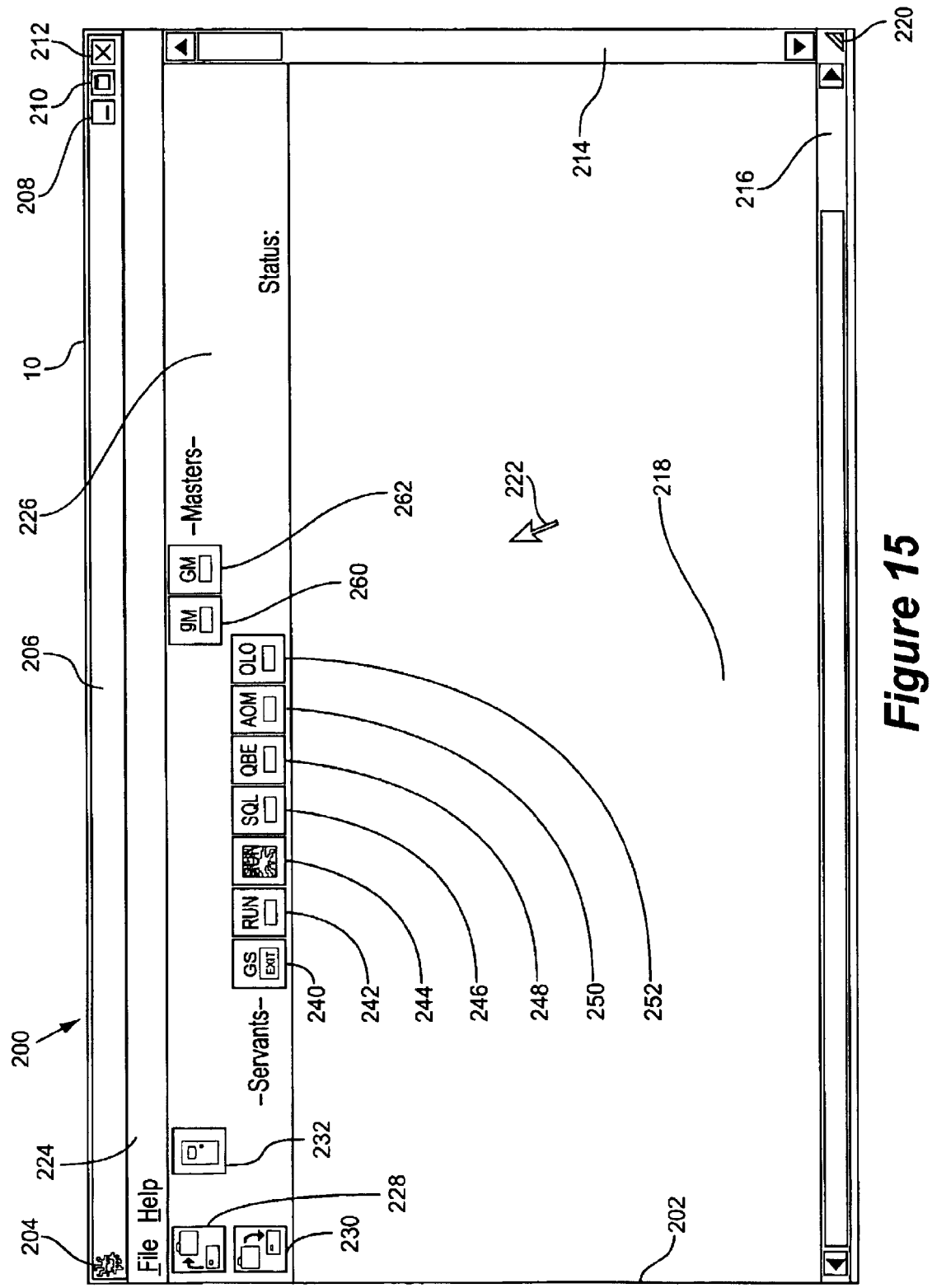
FIG. 15 is an illustration of a typical user interface for a software program incorporating the sequencing method of the present invention.

Referring now to FIG. 15, there is shown an illustration of the user interface as it might appear in a Windows based applications program. As shown in the drawings, the interface includes a main window 200 comprised of a number of common Windows components which are typical in most Windows applications. The main window 200 comprises a window frame 202 which encloses the other parts of the main window 200. A title bar 206 stretches across the top of the main window 200. The system menu and application icon 204 are disposed in the upper left corner of the window at the end of the title bar 206. Three title bar buttons are disposed at the right end of the title bar 206. The left most of these buttons is the minimize window button 208 which allows the user to minimize the window. The button to the immediate right of the minimize window button 208 is the maximize window button 210. This button allows the user to maximize the main window 200. The right most button is the close window button 212 which allows the user to close the main window 200. At the right side of the window there appears a vertical scroll bar 214 which is used for vertical scrolling in the main window 200. Adjacent to the bottom edge of the main window 200 is the horizontal scroll bar 216 which is used for horizontal scrolling. The area enclosed by the main window 200 is referred to as the visible client area 218. The vertical scroll bar 214 and horizontal scroll bar 216 allow the visible client area 218 to be moved vertically and horizontally to view objects which lie outside the boundary of the main window 200. A cursor 222 appears in the visible client area 218 and can be manipulated by a mouse or other input device. In the bottom right corner of the main window 200 is a window size grip 220 which allows the user to re-size the window.

The main functions of the user application are accessed through a menu bar 224 and a tool bar 226. The menu bar 224 lies just below the title bar 206 and provides numerous menu options, such as File and Help. When File is selected, a list of menu options is presented (e.g. New, Open, Save As, Exit). The Help menu activates a help file. It will be understood by those skilled in the art that each menu item may include many menu items as well as sub-menus. The construction of menus for application programs is well known to those skilled in the art.

Just below the menu bar 224 is the main tool bar 226. The tool bar 226 typically consists of a series of buttons, some of which provide access to the same functions as the menu bar 224. For example, at the left end of the tool bar 226 are three buttons which duplicate functions of the menu bar 224. Specifically, the File Open button 228 opens a common windows dialog box for opening files. The File Save button 230 opens a common windows dialog box for saving files. The Exit button 232 closes the application.

The remaining buttons on the user interface 10 are arranged in two groups. As will be hereinafter described, buttons 240, 242, 244, 246, 248, 250, and 252 are used to instantiate task objects 14 in the user interface 10. Buttons 260 and 262 are used to instantiate master objects 16 in the user interface 10. To instantiate an object in the user interface 10, the user selects one of the buttons (usually by clicking on the button with a pointing device 222 such as a mouse), positions the cursor 222 over the visible client area 218, and then clicks at the desired location with the cursor 222. An object of the selected type will be instantiated where the cursor 222 is positioned. This method of using buttons in combination with the cursor 222 to instantiate objects in a user interface 10 is common in Windows applications and is well known to those skilled in the art.

Once an object is instantiated, the default behavior of the object is set through a property sheet. The property sheet may be accessed, for example, by right clicking or double clicking on the object with a pointing device. From the property sheet, the user can set or change the properties of the object instantiated in the user interface 10. The property sheet is used, for example, to set the default behavior or tasks performed by the object. The Inclusion property is also accessed through the property sheet. Another property which is useful is the Hide property of the object. The Hide property allows instantiated objects to be hidden from view. This property is useful, for instance, to control access to object settings. For example, if a new employee is hired, certain object instances may be hidden making such instances inaccessible while allowing the new employee to activate the program. As the employee becomes more familiar with the work environment and the context of the sequence tasks comprising the program, the employee can be given greater access. Hiding an object instance prevents users from interacting with it, i.e., changing property attributes, spatial location, etc., however, the object is still included within the sequence. The Hide property does provide an extra measure of control, flexibility, and security to the program.

In the preferred embodiment of the invention, the top level pop-up menu for each object will be substantially the same even if the objects are of different types. This consistency in the user interface 10 aids the user in quickly interacting with object instances.

As previously indicated, buttons 240-252 allow the user to instantiate task objects 14 in the user interface 10. Each of these buttons represents a different type of task object 14. In the disclosed embodiment, button 240 is used to instantiate an Exit Button object. The Exit Button object provides various means for exiting the current instance of an application.

Button 242 allows the user to instantiate a Run Button object. Button 244 allows the user to instantiate a Run Picture object. Both the Run Button object and Run Picture object are used to launch other applications and to send keystrokes to those applications. The primary difference lies in how the objects appear in the interface. The Run Button object appears as a simple button in user interface 10, whereas the Run Picture object appears as a bitmap image or icon.

Button 246 allows the user to instantiate an SQL Button object. The SQL button Object differs from the Run Button object and Run Picture object in that its default behavior permits access to databases via ODBC (Open Database Connectivity), JDBC (Java Database Connectivity) and SQL (Structured Query Language). Button 248 allows the user to instantiate a QBE button object which permits access to third party query engines incorporating query by example. SQL, QBE, JDBC, and ODBC are well known to those skilled in the art.

Button 250 allows the user to access an Automatic Object Maker (AOM). The AOM permits the user to attach to a pre-existing database file and to select those fields in the database file corresponding to the properties required to instantiate a particular object type. The top-level menu for the AOM presents a drop-down list of available object types which may be instantiated. The user selects records from a database which is used to construct an object instance and to place it on the visible client area 218 as if it had been manually instantiated.

Button 252 allows the user to instantiate and Override Line Object (OLO). This object is like any other task object, except it has the attributes of a line and displays itself as a line. When an OLO object is created, it is linked to other task objects 14 in the user interface 10. The primary reason for using an OLO is when the automatically generated pattern is not the pattern desired to be shown. OLOs provide a means to make exceptions in the automatically generated pattern.

As will be obvious to those skilled in the art of object based interface design, these tools could easily be expanded by adding additional object types having different behavioral characteristics.

Figure 17:
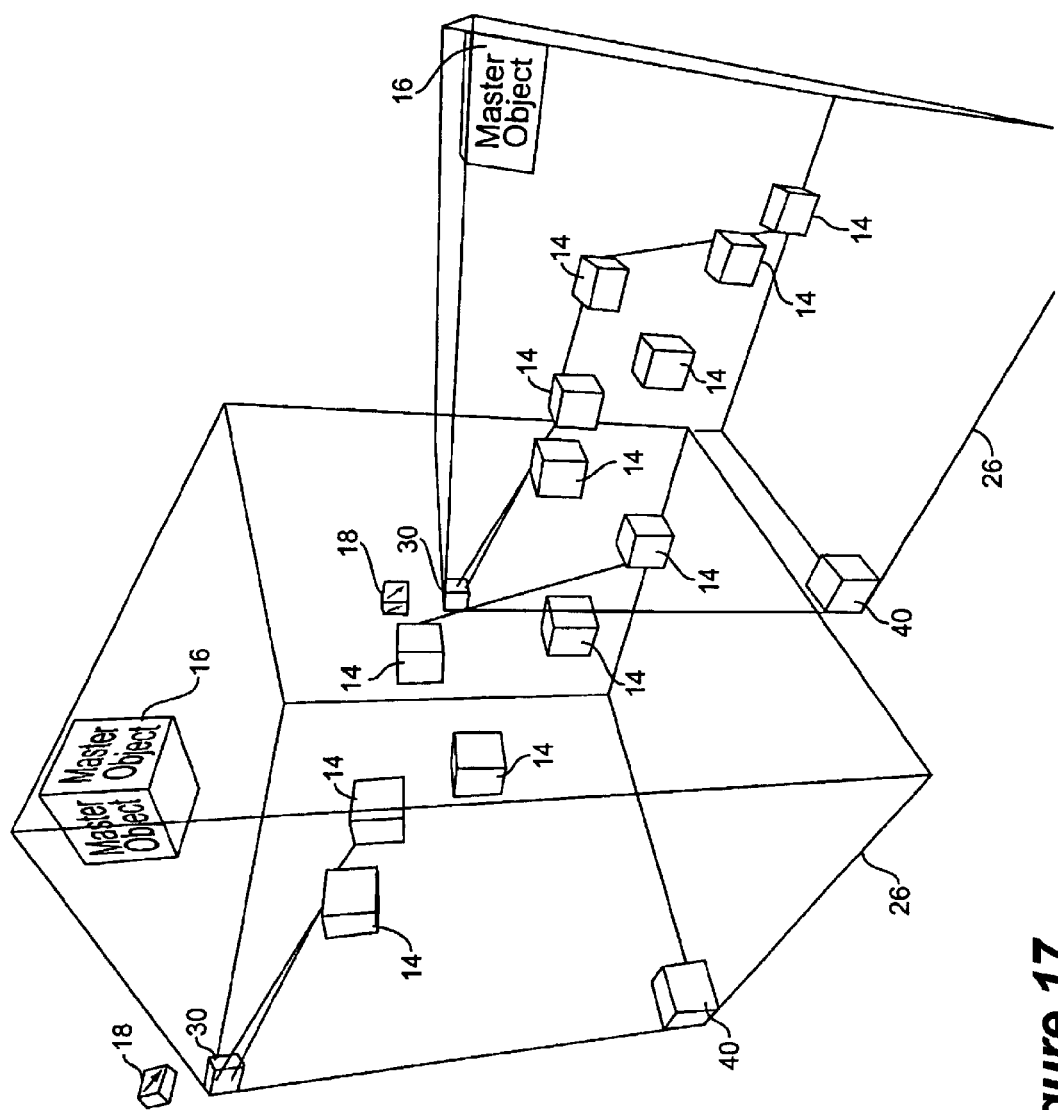
FIG. 17 is an illustration of a 3-dimensional directional field having a plurality of task objects and master objects with limited regions of influence.

The method of sequencing objects, which has been described above for two-dimensional space, may also be implemented in three-dimensional space. FIG. 17 shows a three-dimensional "virtual reality" space which employs the sequencing method of the present invention. The instantiation of objects in 3-D is similar to those in the 2-D medium, however, the objects in the 3-D virtual medium have at least three coordinates. The objects in the 3-D virtual environment also have an inside and an outside surface consisting of one or more sides. Textures may be added to the outside and inside surfaces of the objects. Normally, these textures provide additional information to the user, but may be used to enhance the esthetic properties reflecting the fundamental object attributes particular to the application.

FIG. 17 shows two master objects 16 each having a limited Region of Influence 26. Each Region of Influence 26 includes a plurality of task objects 14. A spatial sequence indicator 18 is associated with each Region of Influence 26. The spatial sequence indicator 18 indicates how the objects within the particular Region of Influence 26 are sequenced. For example, in the embodiment shown, the spatial sequence indicators 18 reflect the directional attribute as being FRONT TO BACK—UPPER LEFT TO LOWER RIGHT.

The three-dimensional embodiment of the present invention has several objects which do not exist in the 2-D embodiment which may be generally described as out-in objects. An out-in object is a three dimensional object which may be entered by the user. In the disclosed embodiment, the out-in object may serve several purposes. One purpose of the out-in object is to display information to the user. The information is displayed on both the interior and exterior surfaces of the out-in object. Thus, the information displayed on the out-in object is visible to the user whether the user is located inside or outside the object. The out-in object can also be used as a method for inputting commands by the user or to otherwise allow the user to interact with the environment.

Three types of out-in objects are used including the orientation view box 30, the spatial sequence indicator 18, and the out-in menu object 40. The orientation view box 30 (OVB) is a six-sided box with each side labeled to correspond with the relative view within the virtual environment: FRONT, RIGHT, BACK, LEFT, TOP OR BOTTOM. These labels may also be found on the inside of the orientation view box 30 in case the viewer goes into the box. The purpose of the orientation view box 30 is to provide a quick means of reference to orient the viewer's position within a particular region of influence 26.

Another out-in object is the spatial sequence indicator 18. In the 3-D embodiment, the spatial sequence indicator 18 is represented as a cube with the icon displayed on each of the six interior and exterior surfaces of the cube. This allows the user to determine the directional attribute of the directional field 12 from many different vantage points from both within and without the objects.

A third type of out-in object is the out-in menu object 40. The out-in menu object 40 takes the place of the top level, upper menus in the 2-D embodiment. The out-in menu object 40 provides the same functionality as the pop-up menu found in the 2-D embodiment. However, unlike the 2-D display medium, the 3-D virtual medium is made more efficient by having the menu items presented simultaneously on multiple object surfaces, enabling not only viewing, but interaction from any perspective either outside or inside the object. If the user finds himself inside an out-in menu object 40, he can interact with the interior surfaces of the object without the need to exit the object or change position, thus saving time.

In the 3-D embodiment, the out-in menu object 40 for the 3-D directional field is located at one corner of the field. Out-in menu objects 40 for the task objects 14 and master objects 16 are located in the interior of these objects. It should be understood that the task objects 14 and master objects 16 are also out-in objects.

Figure 18:
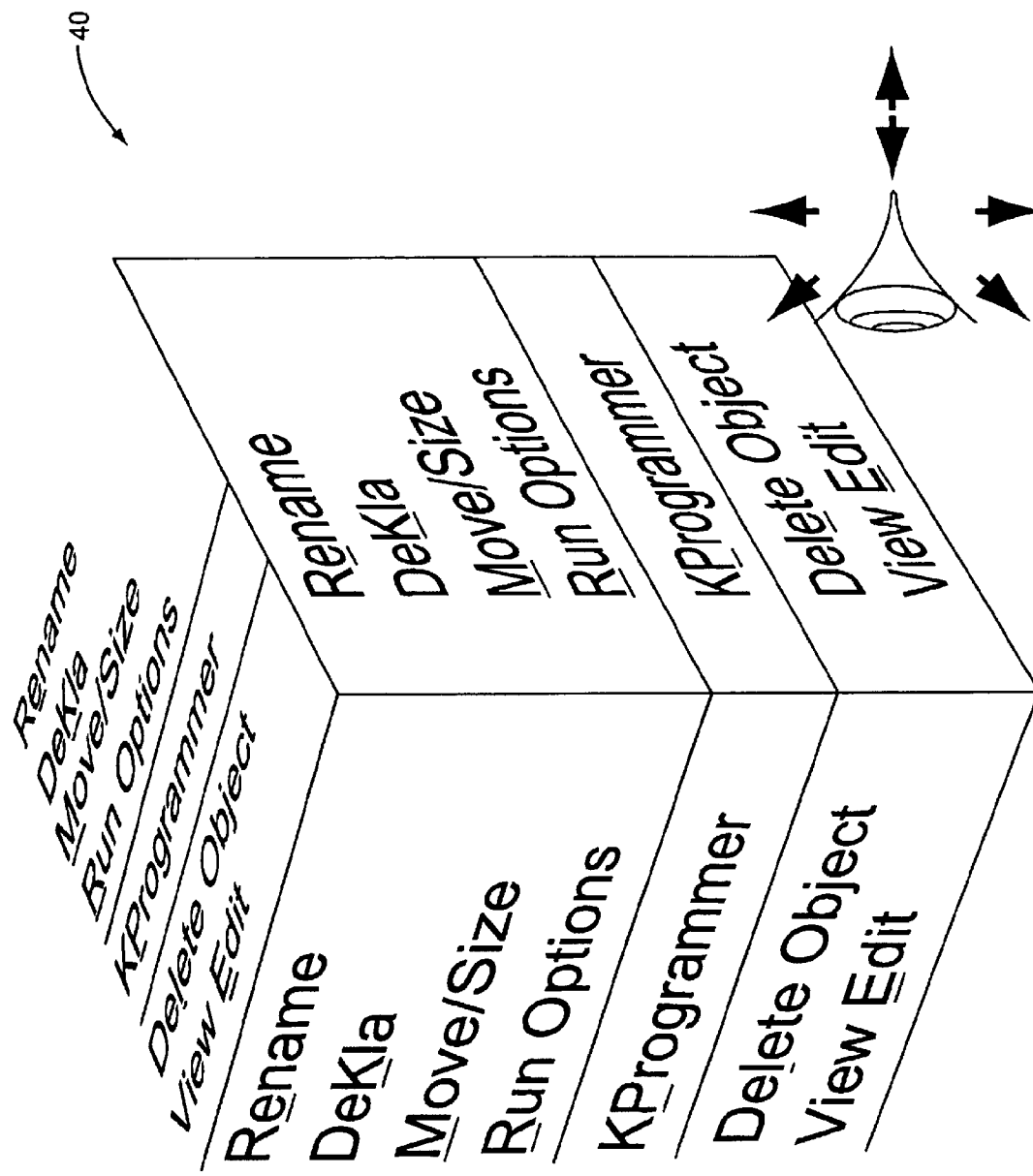
FIG. 18 is an exterior view of an out-in menu object.
Figure 19:
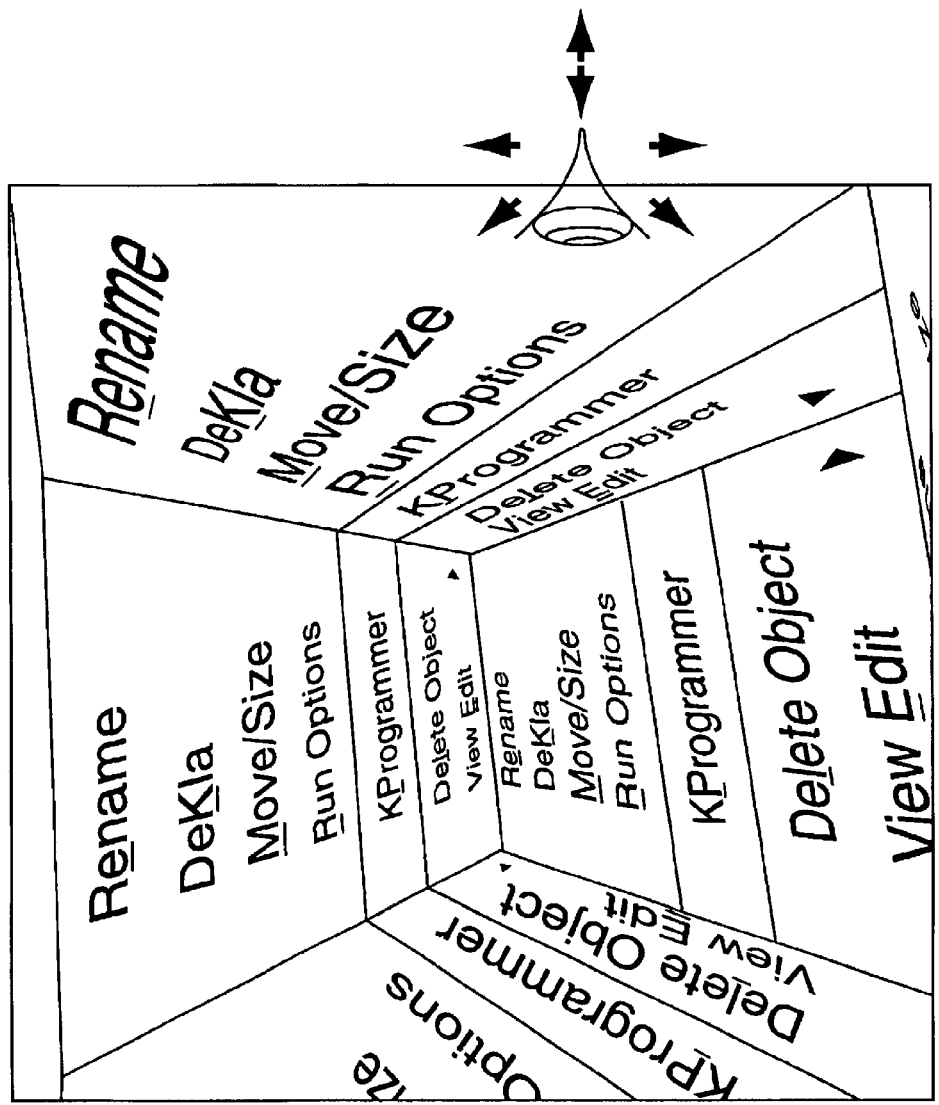
FIG. 19 is an interior view of an out-in menu object.

FIG. 18 shows an out-in menu object 40 viewed from the exterior thereof. FIG. 19 shows an out-in menu object 40 viewed from the interior thereof. As shown in these figures, the menu items appear on both the interior and exterior surfaces of the object so that interaction with the menu object 40 is possible whether the user is inside or outside the objects.

The method of sequencing in the 3-D embodiment is the same as the method used in the 2-D embodiment. When the master object 16 is triggered, the tasks represented by the task objects 14 are sequenced and performed. The spatial sequence indicator 18 determines the ordering criteria to be applied. In the embodiment shown in FIG. 17, objects are sequenced from front to back and then from upper left to lower right. As the actions associated with each task object 14 are performed, a sequencing line is drawn connecting the two objects together. Objects in the 3-D embodiment also have an Include property which can be used to exclude particular tasks from the sequence as previously described.

Figure 20:
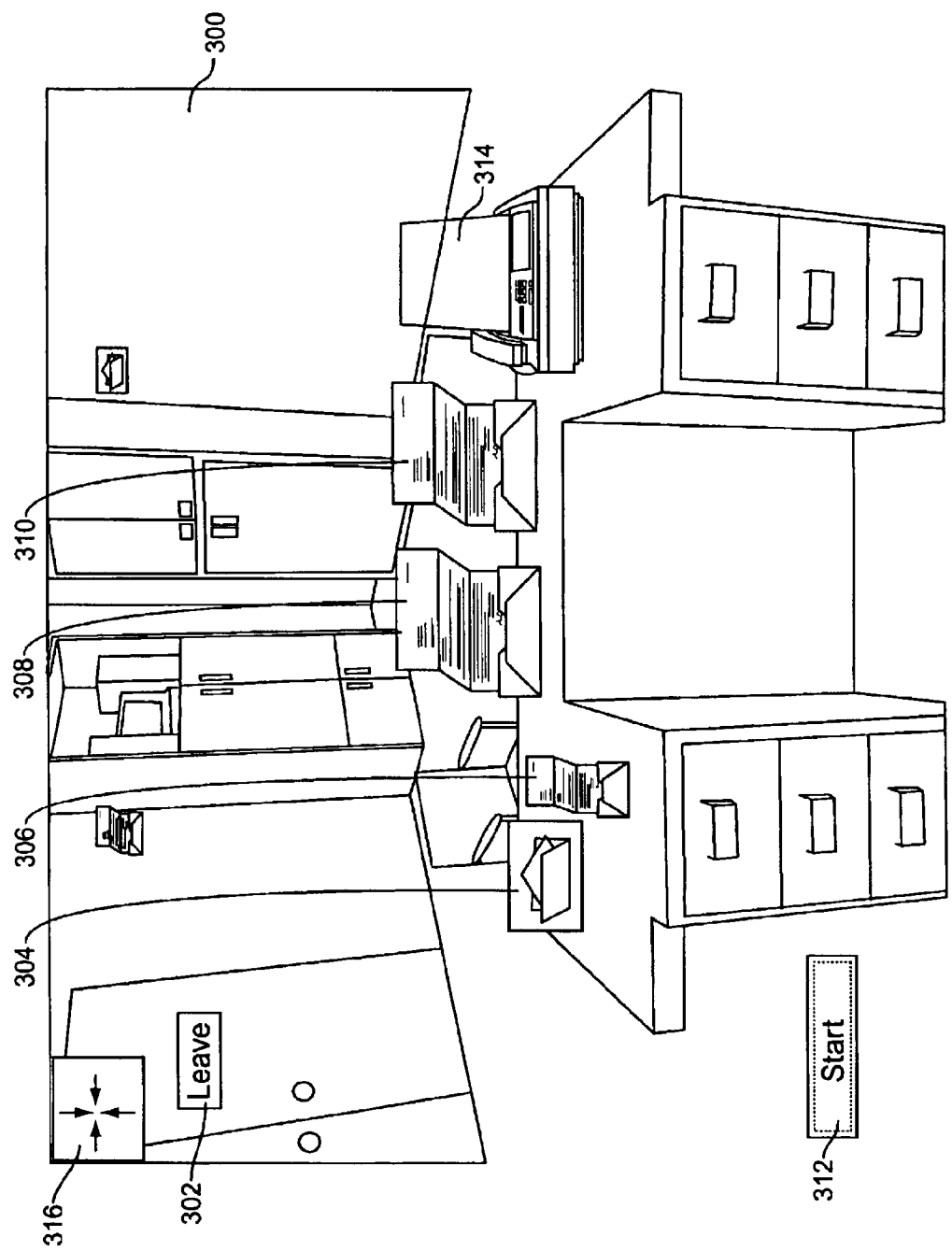
FIG. 20 is an illustration of a virtual office incorporating the sequencing method of the present invention.
Figure 3:
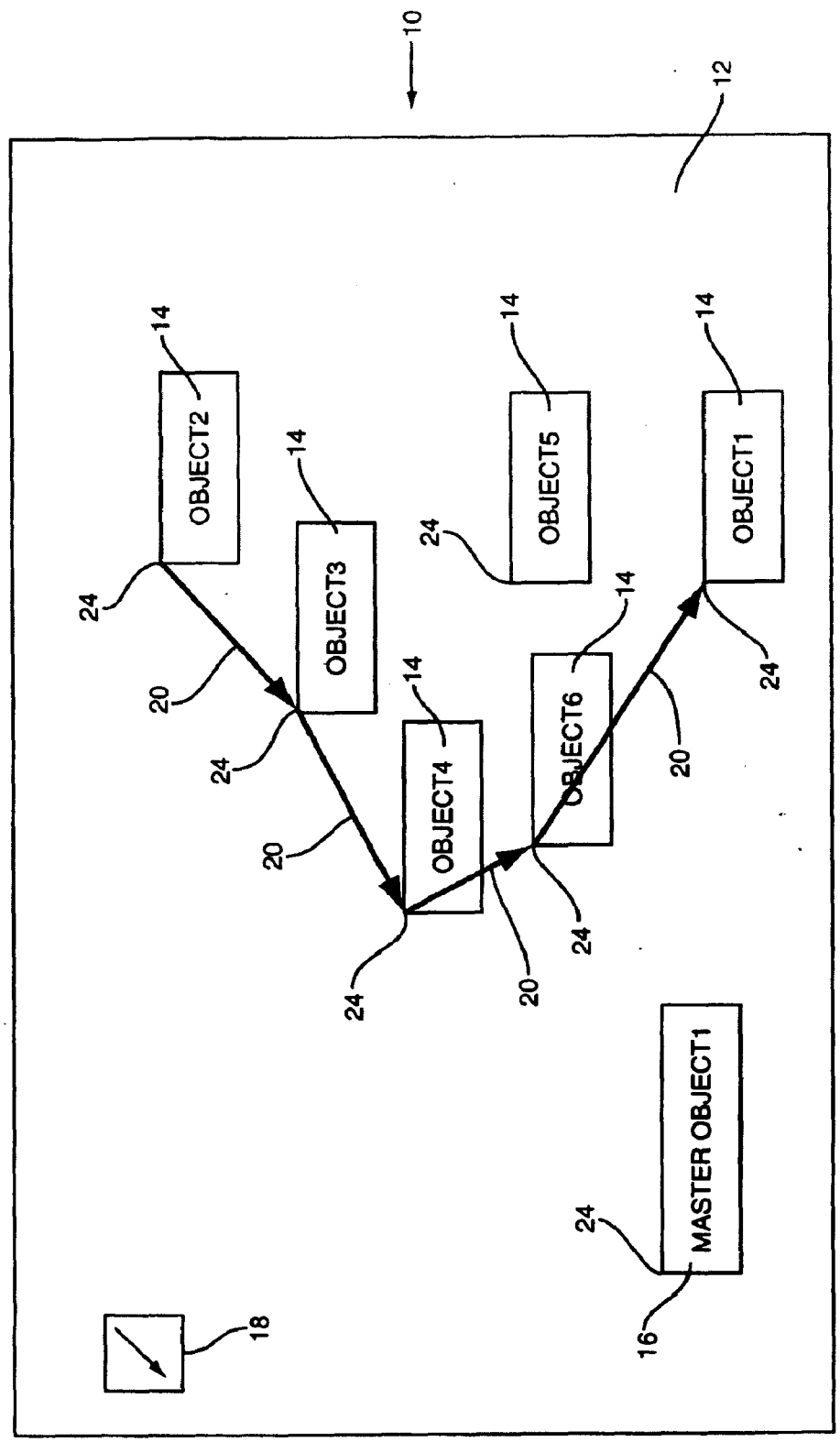
Figure 4:
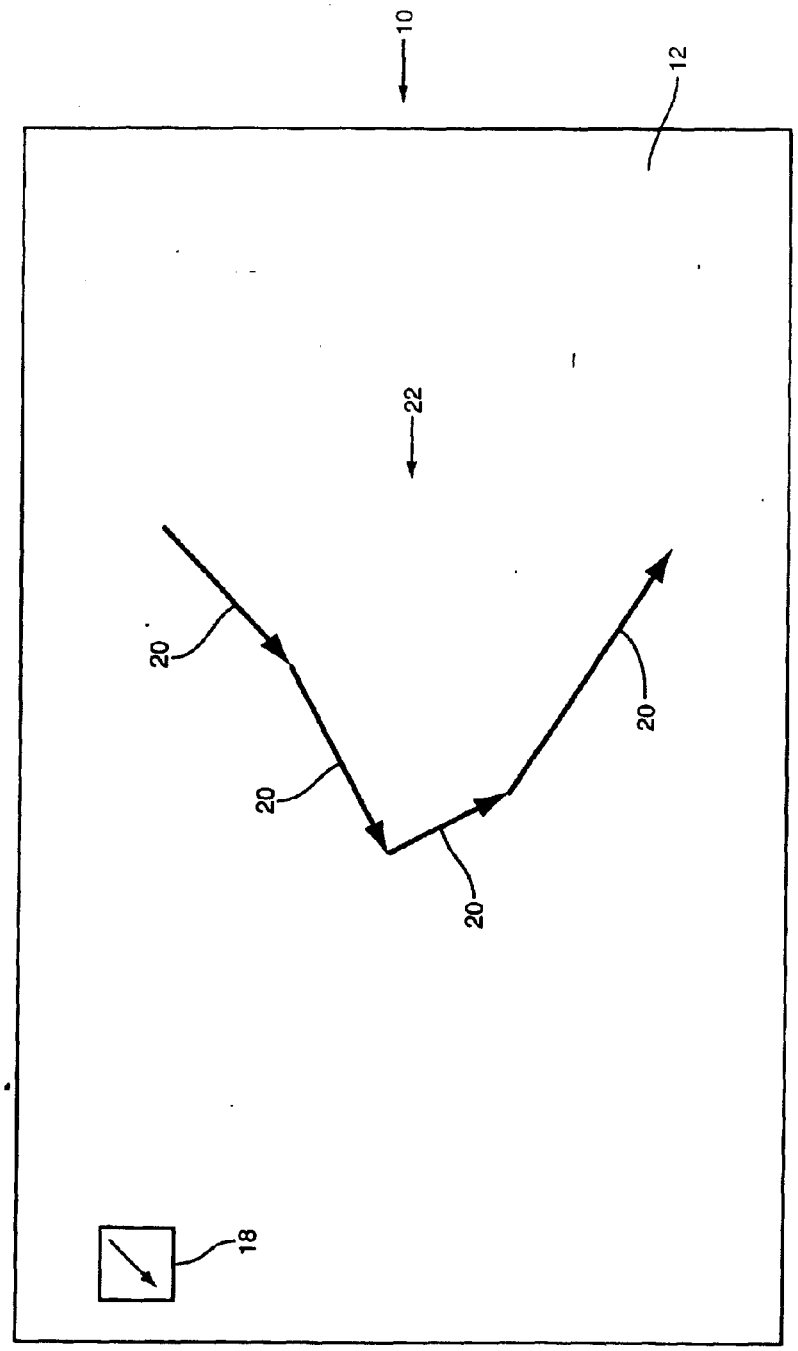

FIG. 20 shows a practical application of the sequencing method previously discussed. FIG. 20 is a virtual office display which allows sequencing and re-sequencing to occur by moving objects within the virtual office space. The practical purpose of the virtual office environment is to present a means of sequencing documents to be faxed. The background image 300 is simply a graphic image stored in an instance of a Picture object containing the office background. By right clicking anywhere on this background, the user can access the properties of the object and make whatever changes are needed, including changing the background by loading a new graphic image. As shown in FIG. 20, the graphic image used illustrates a conventional office with a virtual desk and a door. The door has a leave sign which is actually an Exit Button object 302. Four objects appear on the virtual desk which are actually instances of the Run Picture object previously described. The first object 304 has the appearance of a folder on the desktop. The other three objects 306, 308, and 310 have an appearance that resembles a letter. The Start Button 312 in the lower left of the virtual office is a master object having an external location point 314 located on the image of the fax machine. The spatial sequence indicator 316 indicates that the directional attribute is set to outermost points inward. When the master object 16 is activated, the task associated with the folder object is performed first followed by three letter objects in sequence. The tasks associated with the objects are executed in order from the object farthest from the fax machine to the object closest to the fax machine. The virtual office represents one way in which the present invention might be used to sequence tasks.

The present invention provides an easy and convenient method by which the user or programmer controls the sequencing of tasks by manipulating objects within a graphical user interface. Objects representing the tasks to be performed are placed in a directional field. The tasks associated with each object are automatically sequenced by the computer based on the relative spatial location of the objects in the directional field. The concept of sequencing tasks based on relative spatial location is a new paradigm in the programming arts.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

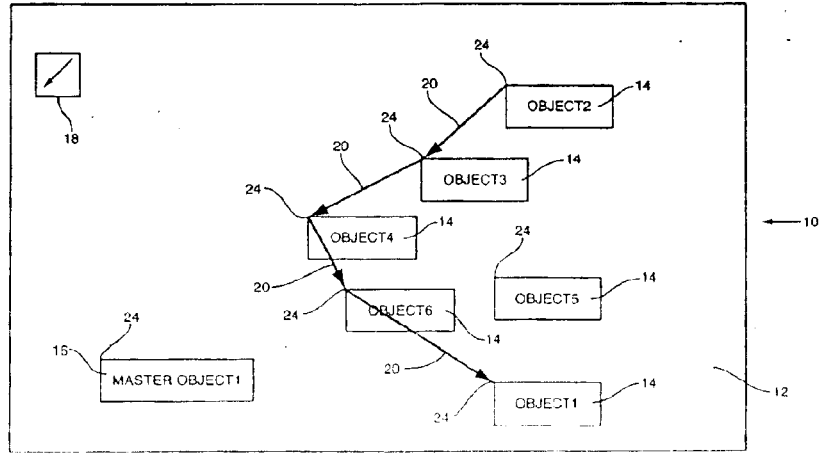

What is claimed is:

1. A method for sequencing a plurality of tasks performed or controlled by a computer, comprising:
   a) placing task objects in an at least two-dimensional directional field having a user-changeable directional attribute, wherein said task objects represent the tasks to be performed by said computer; and
   b) sequencing, by said computer, of one or more of the task objects in the directional area based on the relative spatial location of the task objects in the directional field and the directional attribute of the directional field.

2. The sequencing method of claim 1 further including the step of re-sequencing said task objects by changing the relative spatial location of the task objects in the directional field.

3. The sequencing method of claim 1 further including the step of selecting a directional attribute for the directional field.

4. The sequencing method of claim 1 wherein said task objects have one or more modifiable properties for controlling the behavior of the task objects.

5. The sequencing method of claim 4 wherein one of said modifiable properties is used to include or exclude a task object in the directional field from said sequence.

6. The sequencing method of claim 4 wherein at least one of the modifiable properties specifies the tasks to be performed by the task object.

7. The sequencing method of claim 1 further including the step of placing, a master object in the directional field for initiating said sequence of tasks.

8. The sequencing method of claim 7 wherein said task objects are responsive to said master object to perform their associated tasks.

9. The sequencing method of claim 8 further including the step of defining a limited region of influence for said master object, wherein said master object is used to initiate a sequence including task objects falling within the region of influence of the master object.

10. The sequencing method of claim 9 wherein the sequence includes only those task objects falling within the region of influence of the master object.

11. The sequencing method of claim 8 including a plurality of master objects, each of which has a region of influence, wherein at least one master object is responsive to activation of one or more other master objects to initiate sequencing of task objects within its own control region.

12. The sequencing method of claim 8 further including the steps of selecting a type for each task object from a list of pre-defined types, wherein each master object is programmed to sequence only task objects of certain specified types.

13. The sequencing method of claim 12 further including the step of defining a general type for master objects for sequencing task objects of all types.

14. A method for sequencing a plurality of tasks performed or controlled by a computer comprising:
   a) displaying on a computer display a user interface having an at least two-dimensional directional field;
   b) placing in response to user input, task objects in said directional field, wherein said task objects represent the tasks to be performed by said computer;
   c) selecting, by a user, a directional attribute for said directional field;
   d) sequencing, by said computer, of one or more of the task objects in the directional field based on the relative spatial location of the task objects in the directional field and the directional attribute of the directional field.

15. The sequencing method of claim 14 further including the step of re-sequencing said task objects by changing the relative spatial location of the task objects in the directional field.

16. The sequencing method of claim 14 wherein said task objects have one or more modifiable properties for controlling the behavior of the task objects.

17. The sequencing method of claim 16 wherein one of said modifiable properties is used to include or exclude a task object in the directional field from said sequence.

18. The sequencing method of claim 16 wherein at least one of the user-definable properties is used to specify the tasks to be performed by the task object.

19. The sequencing method of claim 14 further including the step of placing, a master object in the directional field for initiating said sequence of tasks.

20. The sequencing method of claim 19 wherein said task objects are responsive to said master object to perform their associated tasks.

21. The sequencing method of claim 20 further including the step of defining a limited region of influence for said master object, wherein said master object is used to initiate a sequence including task objects falling within the region of influence of the master object.

22. The sequencing method of claim 21 wherein the sequence includes only those task objects falling within the region of influence of the master object.

23. The sequencing method of claim 20 including a plurality of master objects, each of which has a region of influence, wherein at least one master object is responsive to activation of one or more other master objects to initiate sequencing of task objects within its own region of influence.

24. The sequencing method of claim 20 further including the steps of selecting a type for each task object from a pre-defined list of types, wherein each master object is programmed to sequence only task objects of certain specified types.

25. The sequencing method of claim 24 further including the step of defining a general type for master objects for sequencing task objects of all types.

26. A method for sequencing a plurality of tasks performed or controlled by a computer, comprising:
   a) placing task objects in a directional field having at least two dimensions and a user-changeable directional attribute, wherein said task objects represent the tasks to be performed by said computer; and
   b) sequencing, by said computer, of one or more of the task objects in the directional field based on the relative spatial location of the task objects in the directional field and the directional attribute of the directional field.

27. The sequencing method of claim 26 further including the step of re-sequencing said task objects by changing the relative spatial location of the task objects in the directional field.

28. The sequencing method of claim 26 further including the step of selecting a directional attribute for the directional field by a user.

29. The sequencing method of claim 29 wherein said task objects have one or more modifiable properties for controlling the behavior of the task objects.

30. The sequencing method of claim 29 wherein one of said modifiable properties is used to include or exclude a task object in the directional field from said sequence.

31. The sequencing method of claim 29 wherein at least one of the modifiable properties specifies the tasks to be performed by the task object.

32. The sequencing method of claim 26 further including the step of placing a master object in the directional field for initiating said sequence of tasks.

33. The sequencing method of claim 32 wherein said task objects are responsive to said master object to perform their associated tasks.

34. The sequencing method of claim 33 further including the step of defining a limited region of influence for said master object, wherein said master object is used to initiate a sequence including task objects falling within the region of influence of the master object.

35. The sequencing method of claim 34 wherein the sequence includes only those task objects falling within the region of influence of the master object.

36. The sequencing method of claim 33 including a plurality of master objects, each of which has a region of influence, wherein at least one master object is responsive to the activation of one or more other master objects to initiate sequencing of task objects within its own control region.

37. The sequencing method of claim 33 further including the steps of selecting a type for each task object from a list of pre-defined types, wherein each master object is programmed to sequence only task objects of certain specified types.

38. The sequencing method of claim 37 further including the step of defining a general type for master objects for sequencing task objects of all types.

* * * * *

UNITED STATES PATENT AND TRADEMARK OFFICE
CERTIFICATE OF CORRECTION

| | |
|---|---|
| PATENT NO. | : 6,948,173 B1 |
| APPLICATION NO. | : 08/905701 |
| DATED | : September 20, 2005 |
| INVENTOR(S) | : Isom |

Page 1 of 4

It is certified that error appears in the above-identified patent and that said Letters Patent is hereby corrected as shown below:

The illustrative drawing on the Title Page should be deleted and replaced with the attached figure.

Title page #75
The inventor's address on the Title Page should be amended to read:
-- 1201 State Street, Cayce, SC  29033-4343. --

In the Drawings
      Reference number "24" in Fig. 10 should be replaced with reference number -- 18 --.
      Fig. 3 should be deleted and replaced with the attached figure:
      Fig. 4 should be deleted and replaced with the attached figure:

57 Abstract
      Line 1, change "control task" to -- controlled tasks --.
      Line 2, change "task" to -- tasks --.
      Line 7, change "task" to -- tasks --.
      Line 8, change "special" to -- spatial --.

Col. 14 line 45
      Claim 1, line 8, change "area" to -- field --.

Col. 16, line 30
      Claim 29, line 30, change "29" to -- 26 --.

Signed and Sealed this

Twenty-sixth Day of September, 2006

JON W. DUDAS
*Director of the United States Patent and Trademark Office*

(12) United States Patent
Isom

(10) Patent No.: US 6,948,173 B1
(45) Date of Patent: *Sep. 20, 2005

(54) METHOD OF SEQUENCING COMPUTER CONTROLLED TASKS BASED ON THE RELATIVE SPATIAL LOCATION OF TASK OBJECTS IN A DIRECTIONAL FIELD

(76) Inventor: Fred Steven Isom, 3411 ½ Heyward St., Colombia, SC (US) 29205-2755

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1043 days.

(21) Appl. No.: 08/905,701

(22) Filed: Aug. 4, 1997

(51) Int. Cl.⁷ .............................................. G06F 3/00
(52) U.S. Cl. .................................... 719/316; 718/100
(58) Field of Search ........................ 709/100; 395/348; 719/316; 718/100

(56) References Cited

U.S. PATENT DOCUMENTS

| 4,860,204 A | * | 8/1989 | Gendron et al. | 395/702 |
| 5,623,592 A | * | 4/1997 | Carlson et al. | 345/348 |
| 5,767,852 A | * | 6/1998 | Keller et al. | 345/348 |
| 5,850,548 A | * | 12/1998 | Williams | 395/701 |

OTHER PUBLICATIONS

"Widening 'world' of neural nets" Johnson, R. Colin (Electronic Engineering Times, n756, p35, Jul. 26, 1993).*
Ingalls et al., Sep. 25, 1988, Association for Computing Machinery.*

"Graphical Procedural Capability," publication of International Business Machines, *IBM Technical Disclosure Bulletin*, vol. 33, No. 11, Apr. 1991, pp. 184–191.

Lazar, B., "ParcPlace–Digitalk's Parts for Java 1.0", *Software Development*, vol. 5, No. 2, Febrary, 1997, pp. 19–26.

Dunn, J., et al., Test Center Comparison: Workflow Solutions—Going with the Flow, *InfoWorld*, vol. 19, Issue 1, Jan. 6, 1997, pp. 52–60.

Mitchell, K., et al., "Test Center Comparison—Document Workflow Solutions, Juggling deeds, deadlines," *InfoWorld*, vol. 19, Issue 4, Jan. 27, 1997, pp. 96–107.

* cited by examiner

*Primary Examiner*—St. John Courtenay, III
*Assistant Examiner*—George L. Opie
(74) *Attorney, Agent, or Firm*—Coats & Bennett, P.L.L.C.

(57) ABSTRACT

A graphical method for sequencing computer control task uses objects to represent the task to be performed by the computer. The objects are placed in a directional field having a directional attribute which specifies how the tasks are to be sequenced. The sequence of tasks to be performed collectively defines a procedure. When the procedure is initiated, the computer automatically sequences the task within the procedure based on the relative special location of the task objects and the directional attribute. The sequence can be modified by changing the relative location of the task objects or by changing the directional attribute.

38 Claims, 20 Drawing Sheets